US012293715B2

(12) United States Patent
Liu et al.

(10) Patent No.: US 12,293,715 B2
(45) Date of Patent: May 6, 2025

(54) PIXEL CIRCUIT, DRIVING METHOD AND DISPLAY DEVICE

(71) Applicant: BOE TECHNOLOGY GROUP CO., LTD., Beijing (CN)

(72) Inventors: Weixing Liu, Beijing (CN); Zhiqiang Xu, Beijing (CN); Jintao Peng, Beijing (CN); Chunfang Zhang, Beijing (CN); Wanpeng Teng, Beijing (CN); Kai Guo, Beijing (CN); Jiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/247,634

(22) PCT Filed: Jun. 24, 2022

(86) PCT No.: PCT/CN2022/101320

§ 371 (c)(1),
(2) Date: Mar. 31, 2023

(87) PCT Pub. No.: WO2023/245674

PCT Pub. Date: Dec. 28, 2023

(65) Prior Publication Data

US 2024/0371323 A1 Nov. 7, 2024

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0852* (2013.01); *G09G 2300/0861* (2013.01); *G09G 2310/08* (2013.01)

(58) Field of Classification Search
CPC ............. G09G 2310/08; G09G 3/3233; G09G 3/2007; G09G 2300/0852;
(Continued)

(56) References Cited

U.S. PATENT DOCUMENTS 10,950,176 B2 * 3/2021 Zhang .................. G09G 3/3291
11,024,231 B2 * 6/2021 Gao ..................... G09G 3/3233
(Continued)

FOREIGN PATENT DOCUMENTS

CN 1691118 A 11/2005
CN 105047169 A 11/2015
(Continued)

OTHER PUBLICATIONS

China National Intellectual Property Administration, Office Action and Search Report Issued in Application No. 202010974951.4, Jul. 22, 2023, 8 pages. (Submitted with Partial Translation).

*Primary Examiner* — Ricardo Osorio
(74) *Attorney, Agent, or Firm* — McCoy Russell LLP

(57) ABSTRACT

A pixel circuit includes a light emitting element, a first energy storage circuit, a first driving circuit, a second driving circuit, a first driving control circuit, a second driving control circuit, a second energy storage circuit and a first control data voltage writing-in circuit; the first control data voltage writing-in circuit controls to write a first control data voltage into the third node under the control of a first writing-in control signal; both the first terminal of the first driving circuit and the first terminal of the second driving circuit are electrically connected to a power supply voltage terminal, the first driving circuit is used to drive the light emitting element under the control of a potential of the control terminal thereof, and the second driving circuit is used to drive the light emitting element under the control of a potential of the control terminal thereof.

19 Claims, 9 Drawing Sheets

(58) Field of Classification Search
CPC ......... G09G 2300/0861; G09G 3/3208; G09G 3/3225; G09G 3/32
See application file for complete search history.

(56) References Cited

U.S. PATENT DOCUMENTS

| | | | | |
|---|---|---|---|---|
| 2004/0263440 | A1* | 12/2004 | Kimura | G09G 3/2011 345/76 |
| 2005/0242746 | A1 | 11/2005 | Miyagawa et al. | |
| 2014/0320446 | A1 | 10/2014 | Kim et al. | |
| 2016/0063922 | A1* | 3/2016 | Tsai | G09G 3/3291 345/76 |
| 2017/0249897 | A1 | 8/2017 | Wang et al. | |
| 2019/0251902 | A1* | 8/2019 | Qian | G09G 3/3291 |
| 2020/0160787 | A1* | 5/2020 | Wang | G09G 3/3233 |
| 2020/0273406 | A1* | 8/2020 | Xu | G09G 3/3233 |
| 2021/0065624 | A1* | 3/2021 | Li | G09G 3/3233 |
| 2021/0125558 | A1* | 4/2021 | Yue | G09G 3/3258 |
| 2021/0201760 | A1 | 7/2021 | Wang et al. | |
| 2021/0272503 | A1* | 9/2021 | Qu | G09G 3/3233 |
| 2021/0407380 | A1 | 12/2021 | Liu et al. | |
| 2022/0406257 | A1 | 12/2022 | Gu et al. | |

FOREIGN PATENT DOCUMENTS

| | | | | |
|---|---|---|---|---|
| CN | 110174969 | A | 8/2019 | |
| CN | 110246459 | A | 9/2019 | |
| CN | 111462679 | A | 7/2020 | |
| CN | 109872680 | B | 11/2020 | |
| CN | 112164369 | A | 1/2021 | |
| CN | 112562589 | A | 3/2021 | |
| CN | 112767874 | A | 5/2021 | |
| CN | 113870767 | A | 12/2021 | |
| CN | 114067737 | A | 2/2022 | |
| CN | 114299874 | A | 4/2022 | |
| CN | 114648941 | A | 6/2022 | |
| JP | 2003162254 | A | 6/2003 | |
| JP | 2004341314 | A | 12/2004 | |
| WO | WO-2019137045 | A1 * | 7/2019 | G09G 3/3233 |
| WO | WO-2021082840 | A1 * | 5/2021 | G09G 3/32 |
| WO | 2021147083 | A1 | 7/2021 | |
| WO | WO-2022067877 | A1 * | 4/2022 | G09G 3/2092 |

* cited by examiner

PIXEL CIRCUIT, DRIVING METHOD AND DISPLAY DEVICE

CROSS REFERENCE TO RELATED APPLICATION

The present disclosure is the U.S. national phase of PCT Application No. PCT/CN2022/101320 filed on Jun. 24, 2022, which is incorporated herein by reference in its entirety.

TECHNICAL FIELD

The present disclosure relates to the field of display technology, in particular to a pixel circuit, a driving method and a display device.

BACKGROUND

In recent years, with the advancement of intelligent display technology, Organic Light Emitting Diode (OLED) has become one of the hotspots in the field of display research today. With the thinning of the display panel and the narrowing of the frame, the optimization design of the display panel becomes stricter.

Related pixel circuits cannot be used for multi-grayscale display, cannot realize 256 grayscale display beyond the general design, and cannot increase the number of displayed grayscales without greatly increasing the cost.

SUMMARY

In one aspect, the present disclosure provides in some embodiments a pixel circuit, including a light emitting element, a first energy storage circuit, a first driving circuit, a second driving circuit, a first driving control circuit, a second driving control circuit, a second energy storage circuit and a first control data voltage writing-in circuit; wherein a first terminal of the first energy storage circuit is electrically connected to a first node, a second terminal of the first energy storage circuit is electrically connected to a second node, and the first energy storage circuit is used for store electrical energy; a control terminal of the first driving control circuit is electrically connected to a third node; a control terminal of the second driving control circuit is electrically connected to a fourth node; the first driving control circuit is also electrically connected to the second node and the control terminal of the first driving circuit, is configured to control to connect or disconnect the second node and the control terminal of the first driving circuit under the control of a potential of the third node; the second driving control circuit is also electrically connected to the second node and the control terminal of the second driving circuit, is configured to control to connect or disconnect the second node and the control terminal of the second driving circuit under the control of a potential of the fourth node; a first terminal of the second energy storage circuit is electrically connected to the third node, and a second terminal of the second energy storage circuit is electrically connected to a first terminal of the first driving circuit, the second energy storage circuit is used to store electric energy; the first control data voltage writing-in circuit is electrically connected to a first writing-in control terminal, a first control data voltage writing-in terminal and the third node respectively, is configured to control to write a first control data voltage provided by the first control data voltage writing-in terminal into the third node under the control of a first writing-in control signal provided by the first writing-in control terminal; both the first terminal of the first driving circuit and the first terminal of the second driving circuit are electrically connected to a power supply voltage terminal, and the second terminal of the first driving circuit and the second terminal of the second driving circuit are all electrically connected to the light emitting element, the first driving circuit is used to drive the light emitting element under the control of a potential of the control terminal of the first driving circuit, and the second driving circuit is used to drive the light emitting element under the control of a potential of the control terminal of the second driving circuit.

Optionally, the third node and the fourth node are a same node.

Optionally, the pixel circuit further includes a third energy storage circuit and a second control data voltage writing-in circuit; a first terminal of the third energy storage circuit is electrically connected to the first terminal of the first driving circuit, and a second terminal of the third energy storage circuit is electrically connected to the control terminal of the second driving control circuit, and the third energy storage circuit is used to store electric energy; the second control data voltage writing-in circuit is electrically connected to a second writing-in control terminal, a second control data voltage writing-in terminal and the fourth node, and is configured to control to write a second control data voltage provided by the second control data voltage writing-in terminal into the fourth node under the control of a second writing-in control signal provided by the second writing-in control terminal.

Optionally, the pixel circuit further includes a data writing-in circuit, a set circuit and a compensation control circuit; wherein the data writing-in circuit is respectively electrically connected to a data line, a third writing-in control terminal and the first node, and is configured to write a data voltage provided by the data line into the first node under the control of a third writing-in control signal provided by the third writing-in control terminal; the set circuit is respectively electrically connected to a set control terminal, a set voltage terminal and the first node, and is configured to write a set voltage provided by the set voltage terminal into the first node under the control of a set control signal provided by the set control terminal; the compensation control circuit is electrically connected to a compensation control terminal, the second node, and the second terminal of the first driving circuit, and is configured to control to connect or disconnect the second node and the second terminal of the first driving circuit under the control of a compensation control signal provided by the compensation control terminal.

Optionally, the pixel circuit further includes a light emitting control circuit; wherein the light emitting control circuit is electrically connected to a light emitting control terminal, the second terminal of the first driving circuit and a first electrode of the light emitting element respectively, is configured to control to connect or disconnect the second terminal of the first driving circuit and the first electrode of the light emitting element under the control of a light emitting control signal provided by the light emitting control terminal; a second electrode of the light emitting element is electrically connected to a first voltage terminal.

Optionally, the pixel circuit further includes a reset circuit; wherein the reset circuit is respectively electrically connected to a reset control terminal, a reset voltage terminal and the first electrode of the light emitting element, and is configured to write a reset voltage provided by the reset voltage terminal into the first electrode of the light emitting element under the control of a reset control signal provided by the reset control terminal; the second electrode of the light emitting element is electrically connected to the first voltage terminal.

Optionally, the first driving control circuit includes a first transistor, the second driving control circuit includes a second transistor, the first driving circuit includes a first driving transistor, and the second driving circuit includes a second driving transistor; a control electrode of the first transistor is electrically connected to the third node, a first electrode of the first transistor is electrically connected to the second node, a second electrode of the first transistor is electrically connected to the control terminal of the first driving circuit; a control electrode of the second transistor is electrically connected to the fourth node, a first electrode of the second transistor is electrically connected to the second node, and a second electrode of the second transistor is electrically connected to the control terminal of the second driving circuit; a control electrode of the first driving transistor is electrically connected to the control terminal of the first driving circuit, a first electrode of the first driving transistor is electrically connected to the first terminal of the first driving circuit, and a second electrode of the first driving transistor is electrically connected to the second terminal of the first driving circuit; a control electrode of the second driving transistor is electrically connected to the control terminal of the second driving circuit, a first electrode of the second driving transistor is electrically connected to the first terminal of the second driving circuit, and a second electrode of the second driving transistor is electrically connected to the second terminal of the second driving circuit.

Optionally, the first energy storage circuit comprises a first capacitor, and the second energy storage circuit comprises a second capacitor; a first terminal of the first capacitor is electrically connected to the first node, and a second terminal of the first capacitor is electrically connected to the second node; a first terminal of the second capacitor is electrically connected to the third node, and a second terminal of the second capacitor is electrically connected to the first terminal of the first driving circuit.

Optionally, the first control data voltage writing-in circuit comprises a third transistor; a control electrode of the third transistor is electrically connected to the first writing-in control terminal, a first electrode of the third transistor is electrically connected to the first control data voltage writing-in terminal, and a second electrode of the third transistor is electrically connected to the third node.

Optionally, the third energy storage circuit comprises a third capacitor, and the second control data voltage writing-in circuit comprises a fourth transistor; a first terminal of the third capacitor is electrically connected to the first terminal of the first driving circuit, and a second terminal of the third capacitor is electrically connected to the control terminal of the second driving control circuit; a control electrode of the fourth transistor is electrically connected to the second writing-in control terminal, a first electrode of the fourth transistor is electrically connected to the second control data voltage writing-in terminal, and a second electrode of the fourth transistor is electrically connected to the fourth node.

Optionally, the data writing-in circuit comprises a fifth transistor; the set circuit comprises a sixth transistor; the compensation control circuit comprises a seventh transistor; a control electrode of the fifth transistor is electrically connected to the third writing-in control terminal, a first electrode of the fifth transistor is electrically connected to the data line, and a second electrode of the fifth transistor is electrically connected to the first node; a control electrode of the sixth transistor is electrically connected to the set control terminal, a first electrode of the sixth transistor is electrically connected to the set voltage terminal, and a second electrode of the sixth transistor is electrically connected to the first node; a control electrode of the seventh transistor is electrically connected to the compensation control terminal, a first electrode of the seventh transistor is electrically connected to the second node, a second electrode of the seventh transistor is electrically connected to the second terminal of the first driving circuit.

Optionally, the light emitting control circuit comprises an eighth transistor; a control electrode of the eighth transistor is electrically connected to the light emitting control terminal, a first electrode of the eighth transistor is electrically connected to the second terminal of the first driving circuit, and a second electrode of the eighth transistor is electrically connected to the first electrode of the light emitting element.

Optionally, the reset circuit comprises a ninth transistor; a control electrode of the ninth transistor is electrically connected to the reset control terminal, a first electrode of the ninth transistor is electrically connected to the reset voltage terminal, and a second electrode of the ninth transistor is electrically connected to the first electrode of light emitting element.

In a second aspect, an embodiment of the present disclosure provides a driving method applied to the pixel circuit, wherein the driving method includes: controlling, by the first driving control circuit, to connect or disconnect the second node and the control terminal of the first driving circuit under the control of the potential of the third node; controlling, by the second driving control circuit, to connect or disconnect the second node and the control terminal of the second driving circuit under the control of the potential of the fourth node; controlling, by the first control data voltage writing-in circuit, to write the first control data voltage provided by the first control data voltage writing-in terminal into the third node under the control of the first writing-in control signal; driving, by the first driving circuit, the light emitting element under the control of the potential of the control terminal of the first driving circuit; driving, by the second driving circuit, the light emitting element under the control of the potential of the control terminal of the second driving circuit.

Optionally, the third node and the fourth node are a same node; the pixel circuit also includes a data writing-in circuit, a set circuit, a compensation control circuit, a light emitting control circuit and a reset circuit; a display period includes a first phase, a second phase and a third phase set successively; the driving method includes: in the first phase, the reset circuit writing the reset voltage provided by the reset voltage terminal into the first electrode of the light emitting element under the control of the reset control signal; the light emitting control circuit controlling to connect the second terminal of first driving circuit and the first electrode of light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal; in the second phase, the data writing-in circuit writing the data voltage provided by the data line into the first node under the control of the third writing-in control signal; the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal; the first control data voltage writing-in circuit controlling to write the first control data voltage provided by the first control data voltage writing-in terminal into the third node under the control of the first writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the third node; in the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit or the second driving circuit driving the light emitting element to emit light.

Optionally, the step of in the second phase, the first driving control circuit controlling to connect or disconnect the second node and the control terminal of the first driving circuit under the control of the potential of the third node includes: when the first control data voltage is a second voltage signal, the first driving control circuit controlling to connect the second node and the control terminal of the first driving circuit under the control of the potential of the third node; when the first control data voltage is a third voltage signal, the first driving control circuit controlling to disconnect the second node from the control terminal of the first driving circuit under the control of the potential of the third node; the step of in the second phase, the second driving control circuit controlling to connect or disconnect the second node and the control terminal of the second driving circuit under the control of the potential of the third node includes: when the first control data voltage is the second voltage signal, the second driving control circuit controlling to disconnect the second node from the control terminal of the second driving circuit under the control of the potential of the third node; when the first control data voltage is the third voltage signal, the second driving control circuit controlling to connect the second node and the control terminal of the second driving circuit under the control of the potential of the third node; the step of the first driving circuit or the second driving circuit driving the light emitting element to emit light includes: when in the second phase, the first driving control circuit controls to connect the second node and the control terminal of the first driving circuit under the control of the potential of the third node, in the third phase, the first driving circuit driving the light emitting element to emit light; when in the second phase, the second driving control circuit controls to connect the second node and the control terminal of the second driving circuit under the control of the potential of the third node, in the third phase, the second driving circuit driving the light emitting element to emit light.

Optionally, the pixel circuit also includes a third energy storage circuit and a second control data voltage writing-in circuit; the pixel circuit also includes a data writing-in circuit, a set circuit, a compensation control circuit, a light emitting control circuit and a reset circuit; a display period includes a first phase, a second phase and a third phase set successively; the driving method includes: in the first phase, the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal; in the second phase, the data writing-in circuit writing the data voltage provided by the data line into the first node under the control of the third writing-in control signal; the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal; the first control data voltage writing-in circuit controlling to write the first control data voltage provided by the first control data voltage writing-in terminal into the third node under the control of the first writing-in control signal; the second control data voltage writing-in circuit writing the second control data voltage provided by the second control data voltage writing-in terminal into the fourth node under the control of the second writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the fourth node; in the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit and/or the second driving circuit driving the light emitting element to emit light.

Optionally, the step of in the second phase, the first driving control circuit controlling to connect or disconnect the second node and the control terminal of the first driving circuit under the control of the potential of the third node includes: when the first control data voltage is a fourth voltage signal, the first driving control circuit controlling to connect the second node and the control terminal of the first driving circuit; when the first control data voltage is a fifth voltage signal, the first driving control circuit controlling to disconnect the second node from the control terminal of the first driving circuit; the step of in the second phase, the second driving control circuit controlling to connect or disconnect the second node and the control terminal of the second driving circuit under the control of the potential of the fourth node includes: when the second control data voltage is a sixth voltage signal, the second driving control circuit controlling to connect the second node and the control terminal of the second driving circuit; when the second control data voltage is a seventh voltage signal, the second driving control circuit controlling to disconnect the second node from the control terminal of the second driving circuit; the step of the first driving circuit and/or the second driving circuit driving the light emitting element to emit light includes: when in the second phase, the first driving control circuit controls to connect the second node and the control terminal of the first driving circuit, and the second driving control circuit controls to disconnect the second node from the control terminal of the second driving circuit, the first driving circuit driving the light emitting element to emit light under the control of the potential of the control terminal of the first driving circuit; when in the second phase, the first driving control circuit controls to disconnect the second node from the control terminal of the first driving circuit, and the second driving control circuit controls to connect the second node and the control terminal of the second driving circuit, the second driving circuit driving the light emitting element to emit light under the control of the potential of the control terminal of the second driving circuit; when in the second phase, the first driving control circuit controls to connect the second node and the control terminal of the first driving circuit, and the second driving control circuit controls to connect the second node and the control terminal of the second driving circuit, the first driving circuit and the second driving circuit jointly driving the light emitting element to emit light under the control of the potential of the control terminal of the first driving circuit and the potential of the control terminal of the second driving circuit.

In a third aspect, an embodiment of the present disclosure provides a display device including the pixel circuit.

DETAILED DESCRIPTION

The following will clearly and completely describe the technical solutions in the embodiments of the present disclosure with reference to the accompanying drawings in the embodiments of the present disclosure. Apparently, the described embodiments are only some of the embodiments of the present disclosure, not all of them. Based on the embodiments in the present disclosure, all other embodiments obtained by persons of ordinary skill in the art without making creative work belong to the protection scope of the present disclosure.

The transistors used in all embodiments of the present disclosure may be thin film transistors or field effect transistors or other devices with the same characteristics. In the embodiments of the present disclosure, in order to distinguish the two electrodes of the transistor other than the gate electrode, one electrode is called the first electrode, and the other electrode is called the second electrode.

In actual operation, when the transistor is a triode, the control electrode may be the base, the first electrode may be a collector, and the second electrode may be an emitter; or, the control electrode may be the base, the first electrode may be an emitter, the second electrode may be a collector.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, the second electrode may be a drain electrode.

Figure 1:
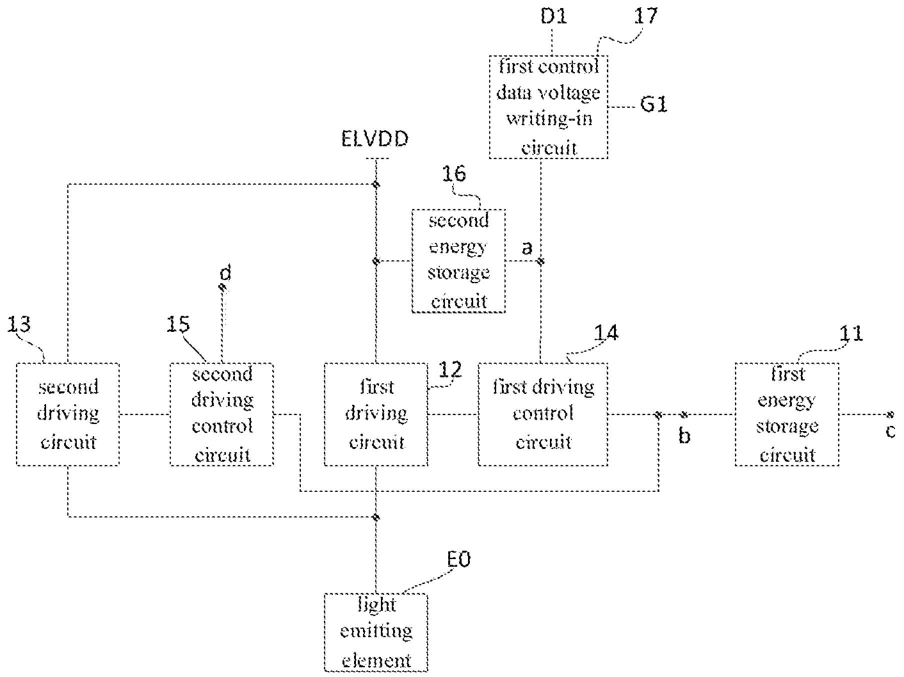
FIG. 1 is a structural diagram of a pixel circuit according to an embodiment of the present disclosure.

As shown in FIG. 1, the pixel circuit described in the embodiment of the present disclosure includes a light emitting element E0, a first energy storage circuit 11, a first driving circuit 12, a second driving circuit 13, a first driving control circuit 14, a second driving control circuit 15, a second energy storage circuit 16 and a first control data voltage writing-in circuit 17;

A first terminal of the first energy storage circuit 11 is electrically connected to a first node c, a second terminal of the first energy storage circuit 11 is electrically connected to a second node b, and the first energy storage circuit 11 is used for store electrical energy;

A control terminal of the first driving control circuit 14 is electrically connected to a third node a; a control terminal of the second driving control circuit 15 is electrically connected to a fourth node d;

The first driving control circuit 14 is also electrically connected to the second node b and a control terminal of the first driving circuit 12, is configured to control to connect or disconnect the second nodes b and the control terminal of the first driving circuit 12 under the control of a potential of the third node a;

The second driving control circuit 15 is also electrically connected to the second node b and a control terminal of the second driving circuit 13, is configured to control to connect or disconnect the second node b and the control terminal of the second driving circuit 13 under the control of a potential of the fourth node d;

A first terminal of the second energy storage circuit 16 is electrically connected to the third node a, and a second terminal of the second energy storage circuit 16 is electrically connected to a first terminal of the first driving circuit 12, the second energy storage circuit 16 is used to store electric energy;

The first control data voltage writing-in circuit 17 is electrically connected to a first writing-in control terminal G1, a first control data voltage writing-in terminal D1 and the third node a respectively, is configured to control to write a first control data voltage Vdata1 provided by the first control data voltage writing-in terminal D1 into the third node a under the control of a first writing-in control signal provided by the first writing-in control terminal G1;

Both the first terminal of the first driving circuit 12 and the first terminal of the second driving circuit 13 are electrically connected to a power supply voltage terminal ELVDD, and the second terminal of the first driving circuit 12 and the second terminal of the second driving circuit 13 are all electrically connected to the light emitting element E0, the first driving circuit 12 is used to drive the light emitting element E0 under the control of the potential of the control terminal of the first driving circuit 12, and the second driving circuit 13 is used to drive the light emitting element E0 under the control of the potential of the control terminal of the second driving circuit 13.

During specific implementation, the power supply voltage terminal ELVDD is used to provide the power supply voltage Vdd.

When the pixel circuit described in the embodiment of the present disclosure is working, the first driving circuit 12 is used to drive the light emitting element E0 to emit light when displaying low grayscale, and the second driving circuit 13 is used to drive the light emitting element E0 to emit light when displaying high grayscale; Or, the first driving circuit 12 is used to drive the light emitting element E0 to emit light when displaying low grayscale, the second driving circuit 13 is used to drive the light emitting element E0 to emit light when displaying middle grayscale, the first driving circuit 12 and the second driving circuit 13 are used to drive the light emitting element E0 to emit light when displaying high grayscale;

The sub-threshold swing of the first driving transistor included in the first driving circuit 12 is consistent with the SS swing of the second driving transistor included in the second driving circuit 13, and can share a range of data voltage values.

In at least one embodiment of the present disclosure, the aspect ratio of the first driving transistor is different from that of the second driving transistor, and the aspect ratio of the second driving transistor is larger than that of the first driving transistor. For example, the aspect ratio of the second driving transistor may be twice that of the first driving transistor, but not limited thereto.

The pixel circuit described in the embodiments of the present disclosure can be used for multi-grayscale display, realize 256-grayscale display, and can increase the number of displayed grayscales without greatly increasing the cost.

In at least one embodiment of the present disclosure, the third node and the fourth node may be the same node.

Figure 2:
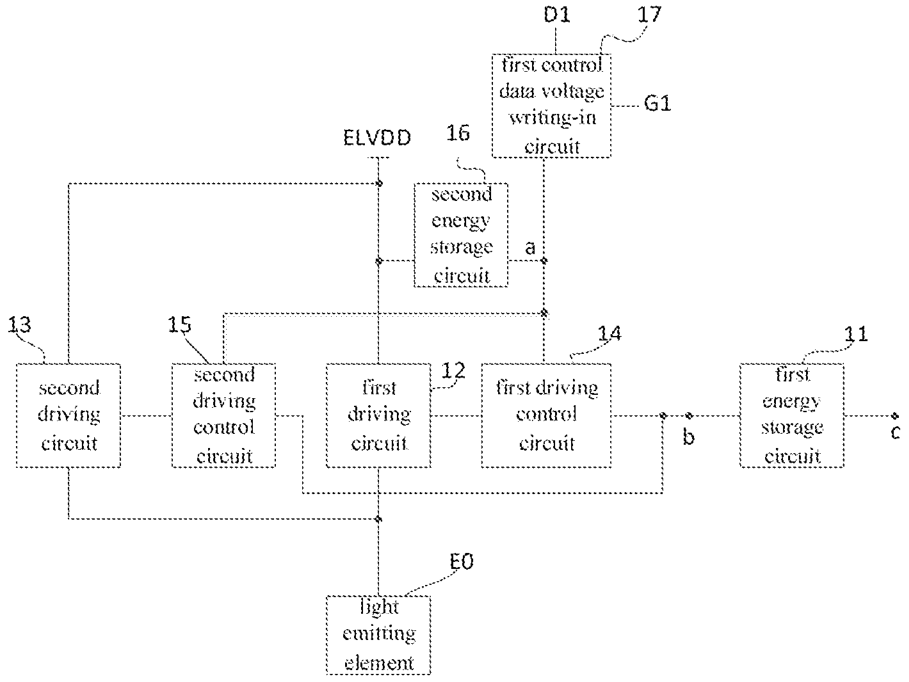
FIG. 2 is a structural diagram of a pixel circuit according to at least one embodiment of the present disclosure.

As shown in FIG. 2, on the basis of the embodiment of the pixel circuit shown in FIG. 1, the third node and the fourth node may be the same node;

The control terminal of the second driving control circuit 15 is electrically connected to the third node a, and is used to control to connect or disconnect the second node b and the second driving circuit 13 under the control of the potential of the third node a.

Figure 3:
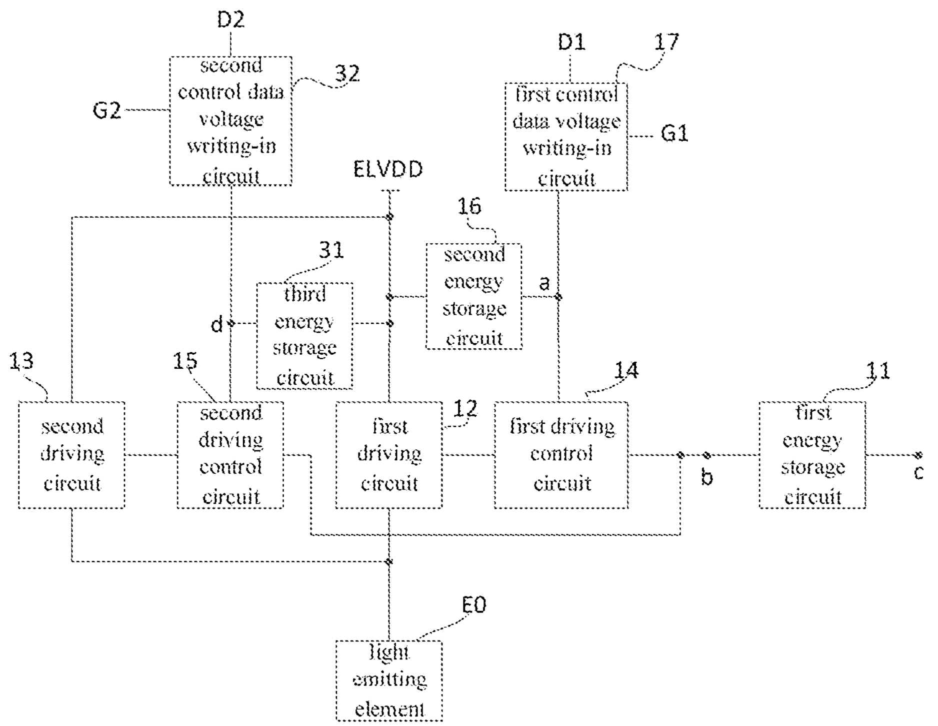
FIG. 3 is a structural diagram of a pixel circuit according to at least one embodiment of the present disclosure.

As shown in FIG. 3, on the basis of the embodiment of the pixel circuit shown in FIG. 1, the pixel circuit described in at least one embodiment of the present disclosure may further include a third energy storage circuit 31 and a second control data voltage writing-in circuit 32;

A first terminal of the third energy storage circuit 31 is electrically connected to the first terminal of the first driving circuit 12, and the second terminal of the third energy storage circuit 31 is connected to the control terminal of the second driving control circuit 15, and the third energy storage circuit 31 is used to store electric energy;

The second control data voltage writing-in circuit 32 is electrically connected to the second writing-in control terminal G2, the second control data voltage writing-in terminal D2 and the fourth node d, and is used to control to write the second control data voltage Vdata2 provided by the second control data voltage writing-in terminal D2 into the fourth node d under the control of the second writing-in control signal provided by the second writing-in control terminal G2.

In at least one embodiment of the present disclosure, the first writing-in control terminal and the second writing-in control terminal may be the same writing-in control terminal, but not limited thereto.

In at least one embodiment of the present disclosure, the pixel circuit further includes a data writing-in circuit, a set circuit and a compensation control circuit;

The data writing-in circuit is respectively electrically connected to a data line, a third writing-in control terminal and the first node, and is used to write the data voltage provided by the data line into the first node under the control of the third writing-in control signal provided by the third writing-in control terminal, to write the data voltage;

The set circuit is respectively electrically connected to a set control terminal, a set voltage terminal and the first node, and is used to write the set voltage provided by the set voltage terminal into the first node under the control of the set control signal provided by the set control terminal, so as to set the potential of the first node;

The compensation control circuit is electrically connected to the compensation control terminal, the second node, and the second terminal of the first driving circuit, and is used to control to connect or disconnect the second node and the second terminal of the first driving circuit under the control of the compensation control signal provided by the compensation control terminal.

In at least one embodiment of the present disclosure, the first writing-in control terminal, the second writing-in control terminal and the third writing-in control terminal may be the same writing-in control terminal, but not limited thereto.

The pixel circuit described in at least one embodiment of the present disclosure further includes a light emitting control circuit;

The light emitting control circuit is electrically connected to the light emitting control terminal, the second terminal of the first driving circuit and the first electrode of the light emitting element respectively, is configured to control to connect or disconnect the second terminal of the first driving circuit and the first electrode of the light emitting element under the control of the light emitting control signal provided by the light emitting control terminal, so as to control to emit light;

The second electrode of the light emitting element is electrically connected to the first voltage terminal.

The pixel circuit described in at least one embodiment of the present disclosure further includes a reset circuit;

The reset circuit is respectively electrically connected to a reset control terminal, a reset voltage terminal and the first electrode of the light emitting element, and is used to write a reset voltage provided by the reset voltage terminal into the first electrode of the light emitting element under the control of the reset control signal provided by the reset control terminal, to reset the potential of the first electrode of the light emitting element;

The second electrode of the light emitting element is electrically connected to the first voltage terminal.

Figure 4:
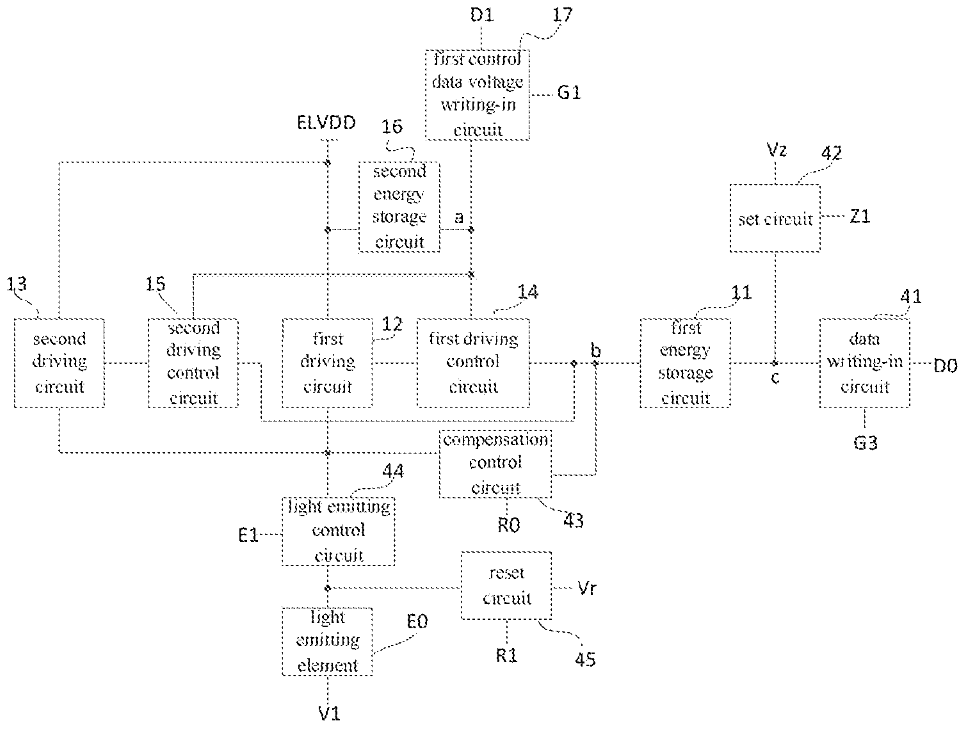
FIG. 4 is a structural diagram of a pixel circuit according to at least one embodiment of the present disclosure.

As shown in FIG. 4, on the basis of at least one embodiment of the pixel circuit shown in FIG. 2, the pixel circuit described in at least one embodiment of the present disclosure further includes a data writing-in circuit 41, a set circuit 42, and a compensation control circuit 43, a light emitting control circuit 44 and a reset circuit 45;

The data writing-in circuit 41 is electrically connected to the data line D0, the third writing-in control terminal G3 and the first node c respectively, and is used to write the data voltage provided by the data line D0 into the first node c under the control of the third writing-in control signal provided by the third writing-in control terminal G3;

The set circuit 42 is electrically connected to the set control terminal Z1, the set voltage terminal Vz and the first node c respectively, and is used to write the set voltage provided by the set voltage terminal Vz into the first node c under the control of the set control signal provided by the set control terminal Z1;

The compensation control circuit 43 is electrically connected to the compensation control terminal R0, the second node b, and the second terminal of the first driving circuit 12 respectively, and is used to control to connect or disconnect the second node b and the second terminal of the first driving circuit 12 under the control of the compensation control signal provided by the compensation control terminal R0;

The light emitting control circuit 44 is electrically connected to the light emitting control terminal E1, the second terminal of the first driving circuit 12 and the first electrode of the light emitting element E0 respectively, and is used to control to connect or disconnect the second terminal of the first driving circuit 12 and the first electrode of the light emitting element E0 under the control of the light emitting control signal provided by the light emitting control terminal E1;

The second electrode of the light emitting element E0 is electrically connected to the first voltage terminal V1;

The reset circuit 45 is electrically connected to the reset control terminal R1, the reset voltage terminal Vr and the first electrode of the light emitting element E0 respectively, and is used to control to write the reset voltage provided by the reset voltage terminal Vr into the first electrode of the light emitting element under the control of the reset control signal provided by the reset control terminal R1.

In at least one embodiment of the present disclosure, the set control terminal may be a light emitting control terminal, the set voltage terminal may be a first voltage terminal, and the compensation control terminal R0 and the reset control terminal R1 may be the same The reset voltage terminal Vr may be the first voltage terminal, but not limited thereto.

When at least one embodiment of the pixel circuit shown in FIG. 4 of the present disclosure is in operation, the display period includes a first phase, a second phase, and a third phase set successively; the driving method includes:

In the first phase, under the control of the reset control signal, the reset circuit 45 writes the reset voltage provided by the reset voltage terminal Vr into the first electrode of the light emitting element E0, so as to control the light emitting element E0 not to emit light, and clear all charge remaining on the first electrode of the light emitting element E0; the light emitting control circuit 44 controls to connect the second terminal of the first driving circuit 12 and the first electrode of the light emitting element E0 under the control of the light emitting control signal; the compensation control circuit 43 controls to connect the second node b and the second terminal of the first driving circuit 12 under the control of the compensation control signal, so as to write the reset voltage into the second node b; the set circuit 42 writes the set voltage provided by the set voltage terminal Vz into the first node c under the control of the set control signal; optionally, the reset voltage and the set voltage can be the same, for example, both can be the low voltage Vss provided by the low voltage terminal;

In the second phase, the data writing-in circuit 41 writes the data voltage Vdata0 provided by the data line D0 into the first node c under the control of the third writing-in control signal, and the reset circuit 45 writes the reset voltage provided by the reset voltage terminal Vr into the first electrode of the light emitting element under the control of the reset control signal, and the light emitting control circuit 44 controls to connect the second terminal of the first driving circuit 12 and the first electrode of the light emitting element E0 under the control of the light emitting control signal. The compensation control circuit 43 controls to connect the second node b and the second terminal of the first driving circuit 12 under the control of the compensation control signal, and the first control data voltage writing-in circuit 17 controls to write the first control data voltage Vdata1 provided by the first control data voltage writing-in terminal D1 into the third node a under the control of the first writing-in control signal; the first driving control circuit 14 controls to connect or disconnect the second node b and the control terminal of the first driving circuit 12 under the control of the potential of the third node a, the second driving control circuit 15 controls to connect or disconnect the second node b and the control terminal of the second driving circuit 13 under the control of the potential of the third node a;

In the third phase, the set circuit 42 writes the set voltage provided by the set voltage terminal Vz into the first node c under the control of the set control signal; the light emitting control circuit 44 controls to connect the second terminal of the first driving circuit 12 and the first electrode of the light emitting element E0 under the control of the light emitting control signal, and the first driving circuit 12 or the second driving circuit 13 drives the light emitting element E0 to emit light.

When at least one embodiment of the pixel circuit shown in FIG. 4 of the present disclosure is working, in the second phase, When the first control data voltage Vdata1 is a second voltage signal, the first driving control circuit 14 controls to connect the second node b and the control terminal of the first driving control circuit 14 under the control of the potential of the third node a;

When the first control data voltage Vdata1 is a third voltage signal, the first driving control circuit 14 controls to disconnect the second node b from the control terminal of the first driving control circuit 14 under the control of the potential of the third node a;

When the first control data voltage Vdata1 is a second voltage signal, the second driving control circuit 15 controls to disconnect the second node b from the control terminal of the second driving control circuit 14 under the control of the potential of the third node a;

When the first control data voltage Vdata1 is a third voltage signal, the second driving control circuit 15 controls to connect the second node b and the control terminal of the second driving control circuit 14 under the control of the potential of the third node a;

In the second phase, when the first driving control circuit 14 controls to connect the second node b and the control terminal of the first driving circuit 12 under the control of the potential of the third node a, in the third phase, the first driving circuit 12 drives the light emitting element E0 to emit light;

In the second phase, when the second driving control circuit 15 controls to connect the second node b and the control terminal of the second driving circuit 13 under the control of the potential of the third node a, in the third phase, the second driving circuit 13 drives the light emitting element E0 to emit light.

In at least one embodiment of the present disclosure, the second voltage signal may be a high voltage signal, and the third voltage signal may be a low voltage signal, but not limited thereto.

Figure 5:
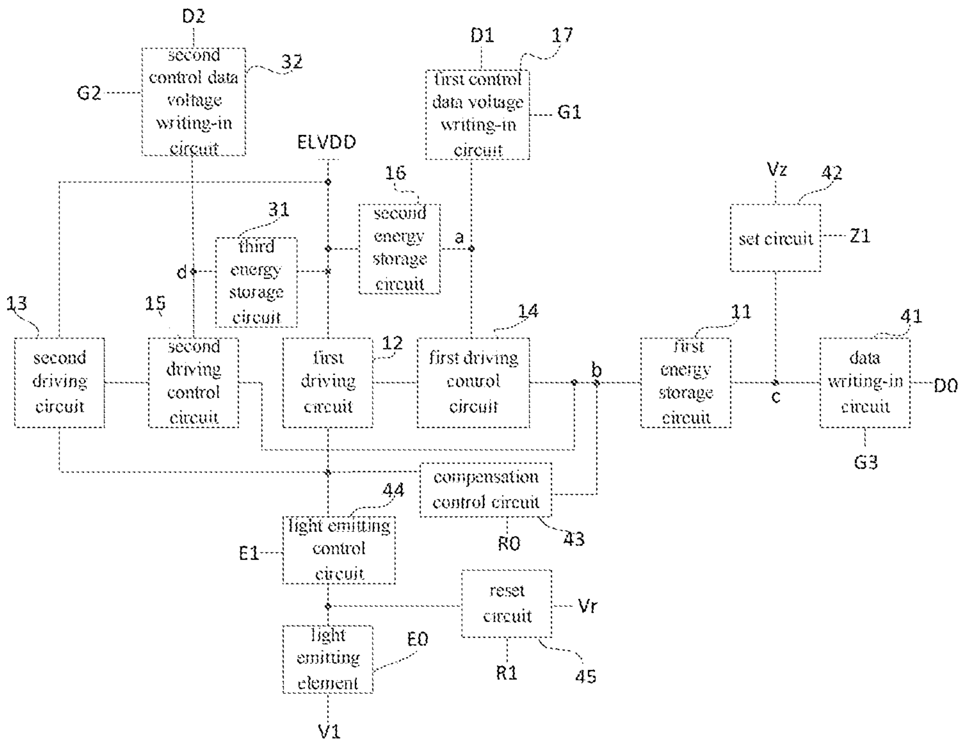
FIG. 5 is a structural diagram of a pixel circuit according to at least one embodiment of the present disclosure.

As shown in FIG. 5, on the basis of at least one embodiment of the pixel circuit shown in FIG. 3, the pixel circuit described in at least one embodiment of the present disclosure further includes a data writing-in circuit 41, a set circuit 42, a compensation control circuit 43, a light emitting control circuit 44 and a reset circuit 45;

The data writing-in circuit is electrically connected to the data line D0, the third writing-in control terminal G3 and the first node c respectively, and is used to write the data voltage provided by the data line D0 into the first node c under the control of the third writing-in control signal provided by the third writing-in control terminal G3;

The set circuit 42 is electrically connected to the set control terminal Z1, the set voltage terminal Vz and the first node c respectively, and is used to write the set voltage provided by the set voltage terminal Vz into the first node c under the control of the set control signal provided by the set control terminal Z1;

The compensation control circuit 43 is electrically connected to the compensation control terminal R0, the second node b, and the second terminal of the first driving circuit 12 respectively, and is used to control to connect or disconnect the second node b and the second terminal of the first driving circuit 12 under the control of the compensation control signal provided by the compensation control terminal R0;

The light emitting control circuit 44 is electrically connected to the light emitting control terminal E1, the second terminal of the first driving circuit 12 and the first electrode of the light emitting element E0 respectively, and is used to control to connect or disconnect the second terminal of the first driving circuit 12 and the first electrode of the light emitting element E0 under the control of the light emitting control signal provided by the light emitting control terminal E1;

The second electrode of the light emitting element E0 is electrically connected to the first voltage terminal V1;

The reset circuit 45 is electrically connected to the reset control terminal R1, the reset voltage terminal Vr and the first electrode of the light emitting element E0 respectively, and is used to control to write the reset voltage provided by the reset voltage terminal Vr into the first electrode of the light emitting element under the control of the reset control signal provided by the reset control terminal R1.

In at least one embodiment of the present disclosure, the set control terminal may be a light emitting control terminal, the set voltage terminal may be a first voltage terminal, and the compensation control terminal R0 and the reset control terminal R1 may be the same control terminal, the reset voltage terminal Vr may be the first voltage terminal, but not limited thereto.

When at least one embodiment of the pixel circuit shown in FIG. 5 of the present disclosure is in operation, the display period may include a first phase, a second phase, and a third phase set successively;

In the first phase, the reset circuit 45 writes the reset voltage provided by the reset voltage terminal Vr into the first electrode of the light emitting element E0 under the control of the reset control signal, and the light emitting control circuit 44 controls to connect the second terminal of the first driving circuit 12 and the first electrode of the light emitting element E0 under the control of the light emitting control signal; the compensation control circuit 43 controls to connect the second node b and the second terminal of the first driving circuit 12 under the control of the compensation control signal, so as to write the reset voltage into the second node b; the set circuit 42 writes the set voltage provided by the set voltage terminal Vz into the first node c under the control of the set control signal;

In the second phase, the data writing-in circuit 41 writes the data voltage Vdata0 provided by the data line D0 into the first node c under the control of the third writing-in control signal, and the reset circuit 45 writes the reset voltage provided by the reset voltage terminal Vr into the first electrode of the light emitting element E0 under the control of the reset control signal, and the light emitting control circuit 44 controls to connect the second terminal of the first driving circuit 12 and the first electrode of the light emitting element E0 under the control of the light emitting control signal; the compensation control circuit 43 controls to connect the second node b and the second terminal of the first driving circuit 12 under the control of the compensation control signal; the first control data voltage writing-in circuit 17 controls to write the first control data voltage Vdata1 provided by the first control data voltage writing-in terminal D1 written into the third node a under the control of the first writing-in control signal; the second control data voltage writing-in circuit 32 controls to write the second control data voltage Vdata2 provided by the second control data voltage writing-in terminal D2 into the fourth node d under the control of the second writing-in control signal; the first driving control circuit 14 controls to connect or disconnect the second node b and the control terminal of the first driving circuit 12 under the control of the potential of the third node a; the second driving control circuit 15 controls to connect or disconnect the second node b and the control terminal of the second driving circuit 13 under the control of the potential of the fourth node d;

In the third phase, the set circuit 42 writes the set voltage provided by the set voltage terminal Vz into the first node c under the control of the set control signal; the light emitting control circuit 44 controls to connect the second terminal of the first driving circuit 12 and the first electrode of the light emitting element E0 under the control of the light emitting control signal, and the first driving circuit 12 and/or the second driving circuit 13 drives the light emitting element E0 to emit light.

When at least one embodiment of the pixel circuit shown in FIG. 5 of the present disclosure is working, in the second phase, when the first control data voltage is the fourth voltage signal, the first driving control circuit 14 controls to connect the second node b and the control terminal of the first driving circuit 12;

When the first control data voltage is a fifth voltage signal, the first driving control circuit 14 controls to disconnect the second node b from the control terminal of the first driving circuit 12;

In the second phase, when the second control data voltage is a sixth voltage signal, the second driving control circuit 15 controls to connect the second node b and the control terminal of the second driving circuit 13;

When the second control data voltage is the seventh voltage signal, the second driving control circuit 15 controls to disconnect the second node b from the control terminal of the second driving circuit 13;

When in the second phase, the first driving control circuit 14 controls to connect the second node b and the control terminal of the first driving circuit 12, and the second driving control circuit 15 controls to disconnect the second node b from the control terminal of the second driving circuit 13, the first driving circuit 12 drives the light emitting element to emit light under the control of the potential of the control terminal of the first driving circuit 12;

When in the second phase, the first driving control circuit 14 controls to disconnect the second node b from the control terminal of the first driving circuit 12, and the second driving control circuit 15 controls to connect the second node b and the control terminal of the second driving circuit 13, the second driving circuit 13 drives the light emitting element E0 to emit light under the control of the potential of the control terminal of the second driving circuit 13;

In the second phase, the first driving control circuit 14 controls to connect the second node b and the control terminal of the first driving circuit 12, and the second driving control circuit 15 controls to connect the second node b and the control terminal of the second driving circuit 13, the first driving circuit 12 and the second driving circuit 13 jointly drive the light emitting element E0 to emit light under the control of the potential of the control terminal of the first driving circuit 12 and the potential of the control terminal of the second driving circuit 13.

In at least one embodiment of the present disclosure, the fourth voltage signal and the sixth voltage signal may be a low voltage signal, and the fifth voltage signal and the seventh voltage signal may be a high voltage signal, but not limited thereto.

Optionally, the first driving control circuit includes a first transistor, the second driving control circuit includes a second transistor, the first driving circuit includes a first driving transistor, and the second driving circuit includes a second driving transistor; a control electrode of the first transistor is electrically connected to the third node, a first electrode of the first transistor is electrically connected to the second node, a second electrode of the first transistor is electrically connected to the control terminal of the first driving circuit;

A control electrode of the second transistor is electrically connected to the fourth node, a first electrode of the second transistor is electrically connected to the second node, and a second electrode of the second transistor is electrically connected to the control terminal of the second driving circuit;

A control electrode of the first driving transistor is electrically connected to the control terminal of the first driving circuit, a first electrode of the first driving transistor is electrically connected to the first terminal of the first driving circuit, and a second electrode of the first driving transistor is electrically connected to the second terminal of the first driving circuit;

A control electrode of the second driving transistor is electrically connected to the control terminal of the second driving circuit, a first electrode of the second driving transistor is electrically connected to the first terminal of the second driving circuit, and a second electrode of the second driving transistor is electrically connected to the second terminal of the second driving circuit.

Optionally, the first energy storage circuit includes a first capacitor, and the second energy storage circuit includes a second capacitor;

A first terminal of the first capacitor is electrically connected to the first node, and a second terminal of the first capacitor is electrically connected to the second node;

A first terminal of the second capacitor is electrically connected to the third node, and a second terminal of the second capacitor is electrically connected to the first terminal of the first driving circuit.

Optionally, the first control data voltage writing-in circuit includes a third transistor;

A control electrode of the third transistor is electrically connected to the first writing-in control terminal, a first electrode of the third transistor is electrically connected to the first control data voltage writing-in terminal, and a second electrode of the third transistor is electrically connected to the third node.

Optionally, the third energy storage circuit includes a third capacitor, and the second control data voltage writing-in circuit includes a fourth transistor;

A first terminal of the third capacitor is electrically connected to the first terminal of the first driving circuit, and a second terminal of the third capacitor is electrically connected to the control terminal of the second driving control circuit;

A control electrode of the fourth transistor is electrically connected to the second writing-in control terminal, a first electrode of the fourth transistor is electrically connected to the second control data voltage writing-in terminal, and a second electrode of the fourth transistor is electrically connected to the fourth node.

Optionally, the data writing-in circuit includes a fifth transistor; the set circuit includes a sixth transistor; the compensation control circuit includes a seventh transistor;

A control electrode of the fifth transistor is electrically connected to the third writing-in control terminal, a first electrode of the fifth transistor is electrically connected to the data line, and a second electrode of the fifth transistor is electrically connected to the first node;

A control electrode of the sixth transistor is electrically connected to the set control terminal, a first electrode of the sixth transistor is electrically connected to the set voltage terminal, and a second electrode of the sixth transistor is electrically connected to the first node;

A control electrode of the seventh transistor is electrically connected to the compensation control terminal, a first electrode of the seventh transistor is electrically connected to the second node, a second electrode of the seventh transistor is electrically connected to the second terminal of the first driving circuit.

Optionally, the light emitting control circuit includes an eighth transistor;

A control electrode of the eighth transistor is electrically connected to the light emitting control terminal, a first electrode of the eighth transistor is electrically connected to the second terminal of the first driving circuit, and a second electrode of the eighth transistor is electrically connected to the first electrode of the light emitting element.

Optionally, the reset circuit includes a ninth transistor;

A control electrode of the ninth transistor is electrically connected to the reset control terminal, a first electrode of the ninth transistor is electrically connected to the reset voltage terminal, and a second electrode of the ninth transistor is electrically connected to the first electrode of light emitting element.

Figure 6:
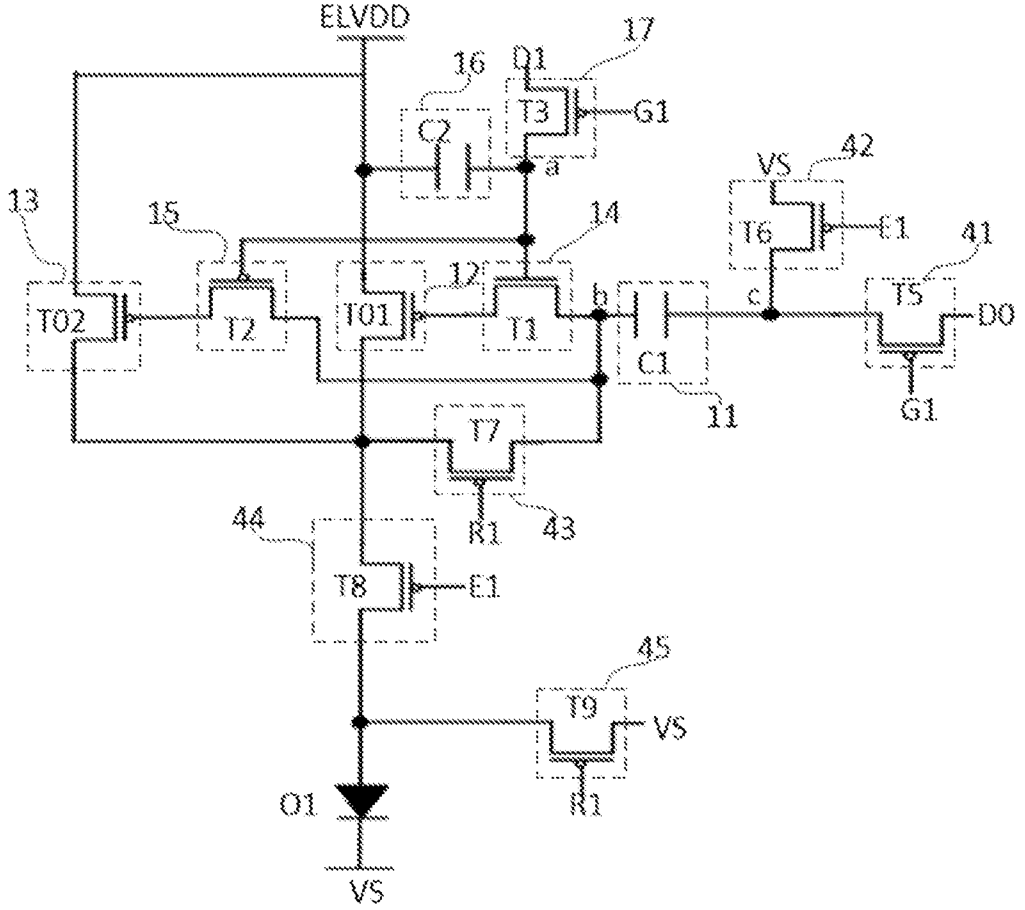
FIG. 6 is a circuit diagram of a pixel circuit according to at least one embodiment of the present disclosure.

As shown in FIG. 6, on the basis of at least one embodiment of the pixel circuit shown in FIG. 4, the light emitting element is an organic light emitting diode O1;

The first driving control circuit 14 includes a first transistor T1, the second driving control circuit 15 includes a second transistor T2, the first driving circuit 12 includes a first driving transistor T01, and the second driving circuit 13 includes the second driving transistor T02;

The gate electrode of the first transistor T1 is electrically connected to the third node a, the source electrode of the first transistor T1 is electrically connected to the second node b, and the drain electrode of the first transistor T1 is electrically connected to the gate electrode of the first driving transistor T01;

The gate electrode of the second transistor T2 is electrically connected to the third node a, the source electrode of the second transistor T2 is electrically connected to the second node b, and the drain electrode of the second transistor T2 is electrically connected to the gate electrode of the second driving transistor T02;

The first energy storage circuit 11 includes a first capacitor C1, and the second energy storage circuit 16 includes a second capacitor C2;

The first terminal of the first capacitor C1 is electrically connected to the first node c, and the second terminal of the first capacitor C1 is electrically connected to the second node b;

The first terminal of the second capacitor C2 is electrically connected to the third node a, and the second terminal of the second capacitor C2 is electrically connected to the source electrode of the first driving transistor T01;

Both the source electrode of the first driving transistor T01 and the source electrode of the second driving transistor T02 are electrically connected to the power supply voltage terminal ELVDD; the power supply voltage terminal ELVDD is used to provide a power supply voltage Vdd;

The drain electrode of the second driving transistor T02 is electrically connected to the second node b;

The first control data voltage writing-in circuit 17 includes a third transistor T3;

The gate electrode of the third transistor T3 is electrically connected to the first writing-in control terminal G1, the source electrode of the third transistor T3 is electrically connected to the first control data voltage writing-in terminal D1, and the drain electrode of the third transistor T3 is electrically connected to the third node a;

The data writing-in circuit 41 includes a fifth transistor T5; the set circuit 42 includes a sixth transistor T6; the compensation control circuit 43 includes a seventh transistor T7;

The gate electrode of the fifth transistor T5 is electrically connected to the first writing-in control terminal G1, the source electrode of the fifth transistor T5 is electrically connected to the data line D0, and the drain electrode of the fifth transistor T5 is electrically connected to the first node c;

The gate electrode of the sixth transistor T6 is electrically connected to the light emitting control terminal E1, the source electrode of the sixth transistor T6 is electrically connected to the low voltage terminal VS, and the drain electrode of the sixth transistor T6 is electrically connected to the first node c; the low voltage terminal VS is used to provide a low voltage Vss;

The gate electrode of the seventh transistor T7 is electrically connected to the reset control terminal R1, the source electrode of the seventh transistor T7 is electrically connected to the second node b, and the drain electrode of the seventh transistor T7 is electrically connected to the drain electrode of the first driving transistor T01;

The light emitting control circuit 44 includes an eighth transistor T8;

The gate electrode of the eighth transistor T8 is electrically connected to the light emitting control terminal E1, the source electrode of the eighth transistor T8 is electrically connected to the drain electrode of the first driving transistor T01, and the drain electrode of the eighth transistor T8 is electrically connected to the anode of the organic light emitting diode O1;

The reset circuit 45 includes a ninth transistor T9;

The gate electrode of the ninth transistor T9 is electrically connected to the reset control terminal R1, the first electrode of the ninth transistor T9 is electrically connected to the low voltage terminal VS, and the drain electrode of the ninth transistor T9 is electrically connected to the anode of the organic light emitting diode O1.

In at least one embodiment of the pixel circuit shown in FIG. 6, the first writing-in control terminal G1 and the third writing-in control terminal are the same writing-in control terminal; the setting control terminal is the light emitting control terminal E1; the compensation control terminal is the reset control terminal R1; the set voltage terminal is the low voltage terminal VS; the reset voltage terminal is the low voltage terminal VS; but not limited thereto.

In at least one embodiment of the pixel circuit shown in FIG. 6, T1 is an n-type transistor, and transistors other than T1 included in the pixel circuit are p-type transistors, but not limited thereto.

In at least one embodiment of the pixel circuit shown in FIG. 6, the aspect ratio of T02 may be twice that of T01, but not limited thereto.

Figure 7:
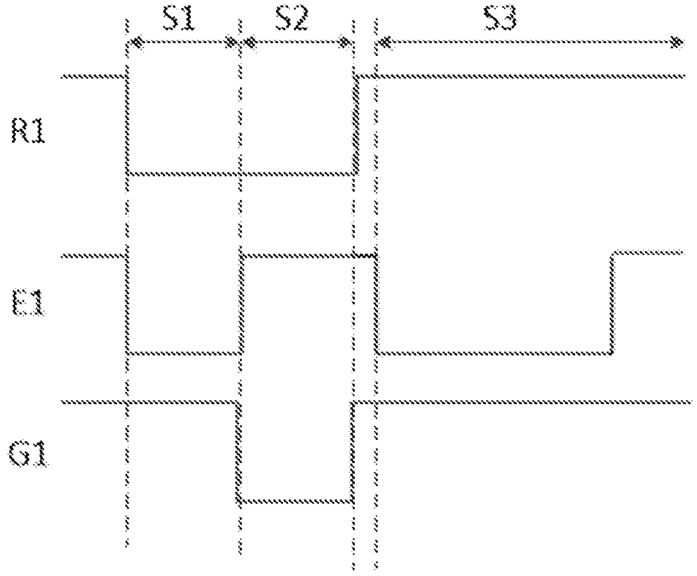
FIG. 7 is a working timing diagram of the pixel circuit shown in FIG. 6 of at least one embodiment of the present disclosure.
Figure 8A:
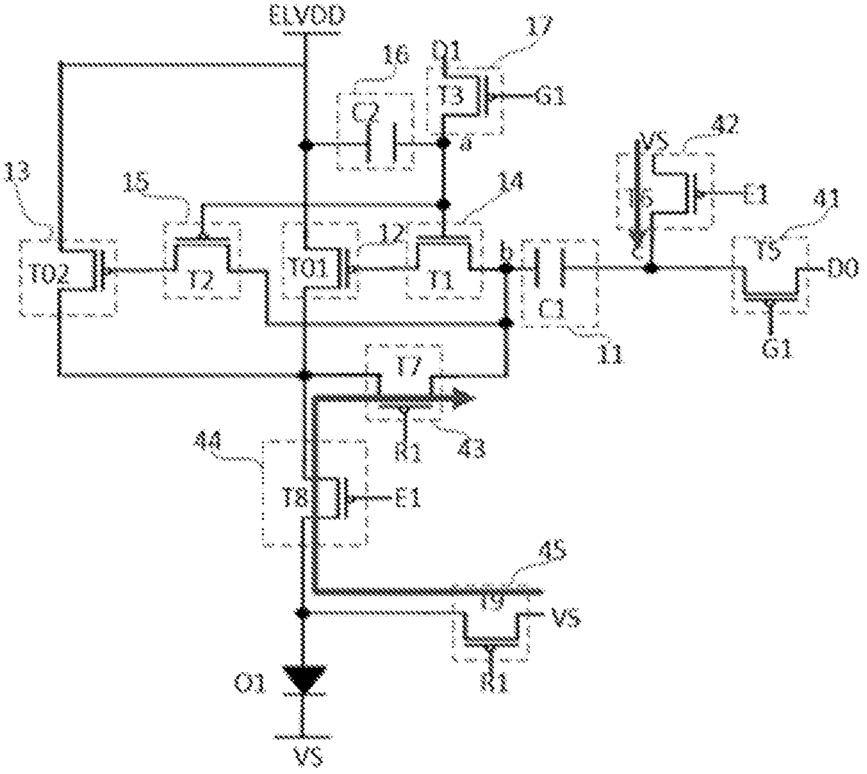
FIG. 8A is a schematic diagram of the working state of the pixel circuit shown in FIG. 6 in the first phase S1 of at least one embodiment of the present disclosure.
Figure 8B:
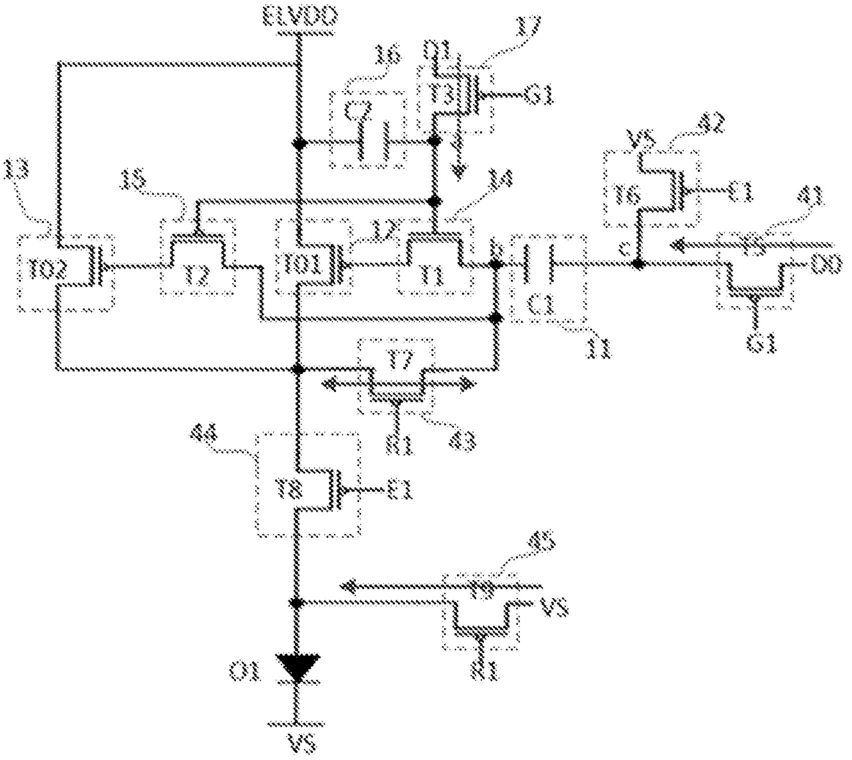
FIG. 8B is a schematic diagram of the working state of the pixel circuit shown in FIG. 6 in the second phase S2 of at least one embodiment of the present disclosure.
Figure 8C:
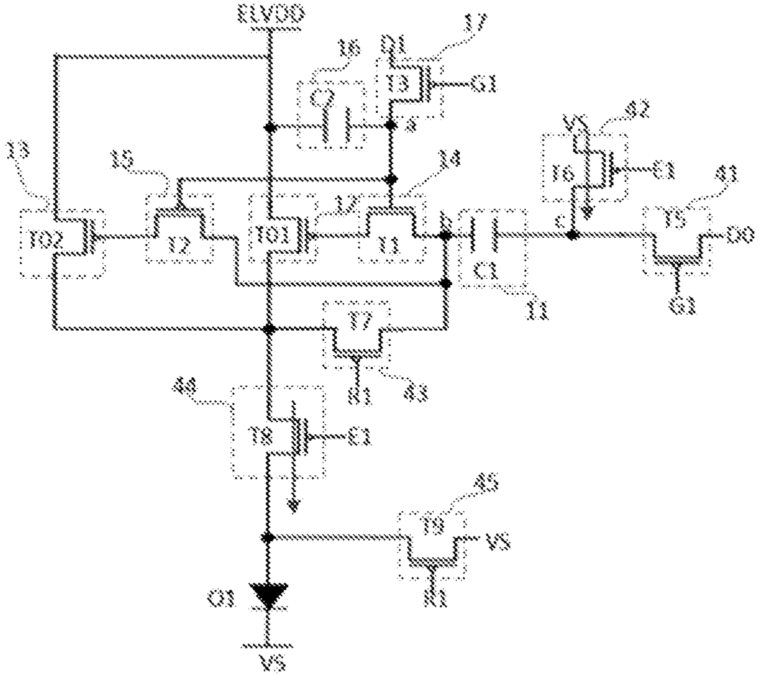
FIG. 8C is a schematic diagram of the working state of the pixel circuit shown in FIG. 6 in the third phase S3 of at least one embodiment of the present disclosure.

As shown in FIG. 7, when at least one embodiment of the pixel circuit shown in FIG. 6 of the present disclosure is in operation, the display period may include a first phase S1, a second phase S2 and a third phase S3 which are set successively;

In the first phase S1, R1 provides a low voltage signal, E1 provides a low voltage signal, and G1 provides a high voltage signal. As shown in FIG. 8A, T7 is turned on, and T6, T9, and T8 are all turned on to control the potential of the second node b to be VSS, and the potential of the third node a is VSS;

In the second phase S2, R1 provides a low voltage signal, E1 provides a high voltage signal, G1 provides a low voltage signal, as shown in FIG. 8B, T9, T7, T5 and T3 are all turned on, D1 provides the first control data voltage Vdata1 to the third node a; D0 provides data voltage Vdata0 to the first node c;

In the second phase S2, when Vdata1 is a low voltage signal, T2 is turned on and T1 is turned off; at the beginning of the second phase S2, T02 is turned on, and the power supply voltage Vdd is charged to C1 through T02 and T7 to increase the potential of the gate electrode of T02 until T02 is turned off, at this time the potential of the gate electrode of T02 becomes Vdd+Vth2, and Vth2 is the threshold voltage of T02;

In the second phase S2, when Vdata1 is a high voltage signal, T1 is turned on and T2 is turned off; at the beginning of the second phase S2, T01 is turned on, and the power supply voltage Vdd is charged to C1 through T01 and T7 to increase the potential of the gate electrode of T01 until T01 is turned off, at this time the potential of the gate electrode of T01 becomes Vdd+Vth1, and Vth1 is the threshold voltage of T01;

In the third phase S3, R1 provides a high voltage signal, E1 provides a low voltage signal, and G1 provides a high voltage signal, as shown in FIG. 8C, T6 and T8 are turned on;

When in the second phase S2, Vdata1 is a low voltage signal, in the third phase S3, the potential of the second node b becomes Vdd+Vth2+Vss−Vdata0, and T02 drives O1 to emit light for high grayscale display. The current I flowing through O1 is equal to K2×(Vdd+Vth2+Vss−Vdata0−Vdd−Vth2)$^2$, I is equal to K2×(Vss−Vdata0)$^2$; K2 is the current coefficient of T02;

When in the second phase S2, Vdata1 is a high voltage signal, in the third phase S3, the potential of the second node b becomes Vdd+Vth1+Vss−Vdata0, and T01 drives O1 to emit light for low grayscale display. The current I flowing through O1 is equal to K1×(Vdd+Vth1+Vss−Vdata0−Vdd−Vth1)$^2$, and I is equal to K1×(Vss−Vdata0)$^2$; K1 is the current coefficient of T01.

In at least one embodiment of the pixel circuit shown in FIG. 6 of the present disclosure, when performing low grayscale display, the display grayscale can be 0-255, but not limited thereto.

Figure 9A:
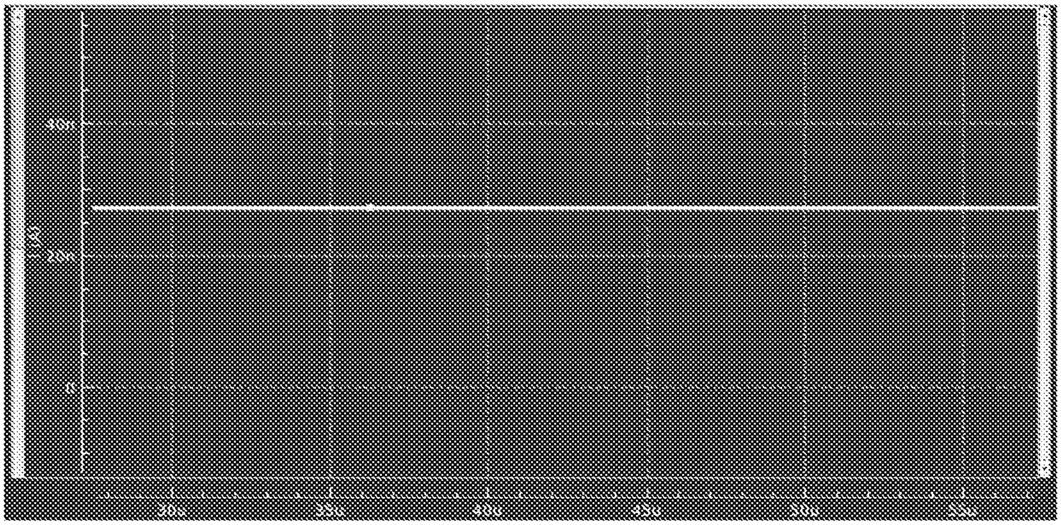
FIG. 9A is a waveform diagram of the current I flowing through the organic light emitting diode O1 during high grayscale display
Figure 9B:
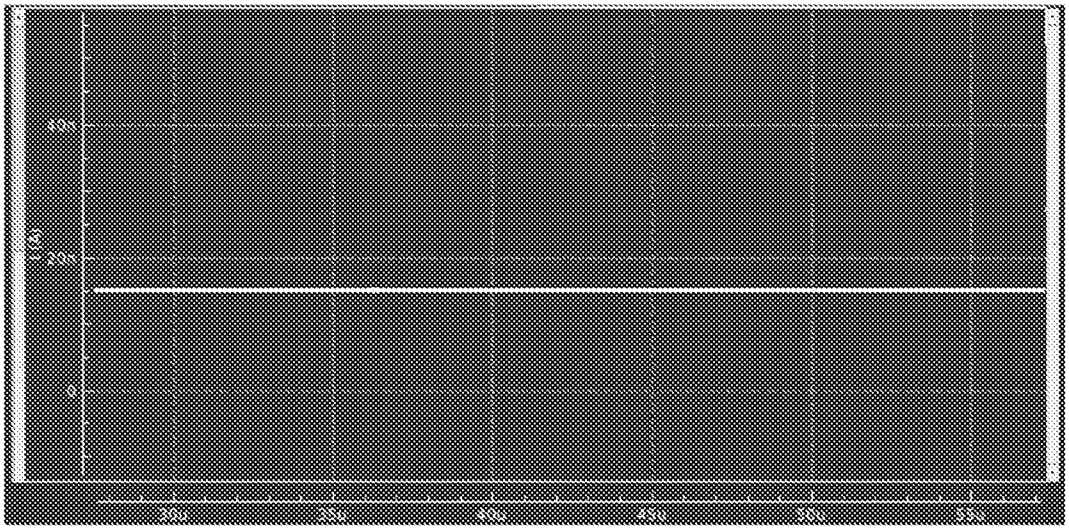
FIG. 9B is a waveform diagram of the current I flowing through the organic light emitting diode O1 during low grayscale display.

When in at least one embodiment of the pixel circuit shown in FIG. 6, the aspect ratio of T02 is 20 um/5 um, and the aspect ratio of T01 is 10 um/5 um, FIG. 9B is a waveform diagram of the current I flowing through O1 during the low grayscale display.

In FIG. 9A and FIG. 9B, the horizontal axis is the time tin seconds, and the vertical axis is the current I flowing through O1 in A (ampere).

In at least one embodiment of the present disclosure, the current coefficient of the driving transistor is proportional to the aspect ratio of the driving transistor. When the other parameters remain unchanged, the change of the aspect ratio of the driving transistor will change the driving current generated by the driving transistor.

Figure 10:
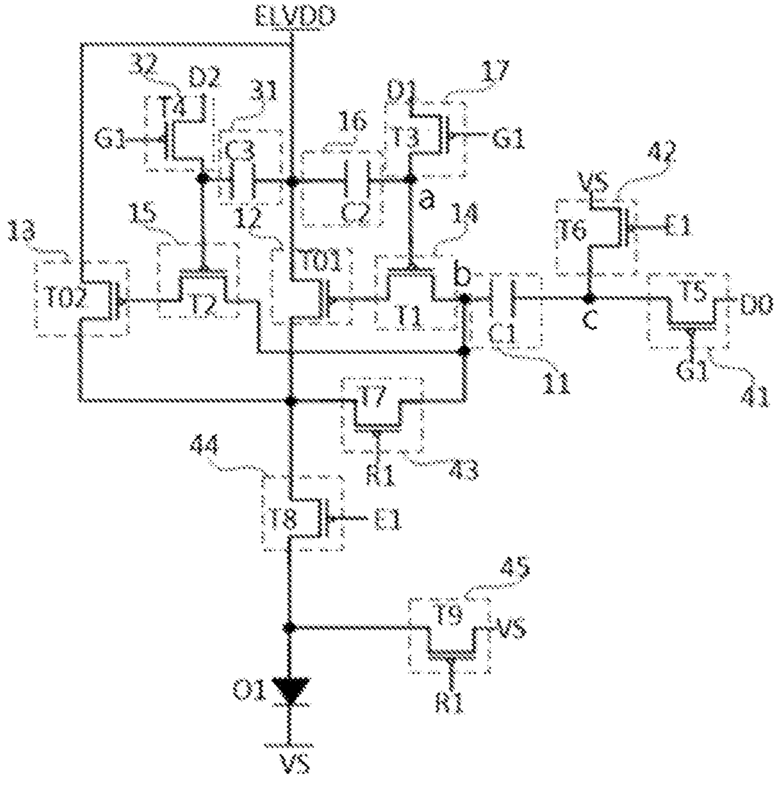
FIG. 10 is a circuit diagram of a pixel circuit according to at least one embodiment of the present disclosure.

As shown in FIG. 10, on the basis of at least one embodiment of the pixel circuit shown in FIG. 5, the light emitting element is an organic light emitting diode O1;

The first driving control circuit 14 includes a first transistor T1, the second driving control circuit 15 includes a second transistor T2, the first driving circuit 12 includes a first driving transistor T01, and the second driving circuit 13 includes the second driving transistor T02;

The gate electrode of the first transistor T1 is electrically connected to the third node a, the source electrode of the first transistor T1 is electrically connected to the second node b, and the drain electrode of the first transistor T1 is electrically connected to the gate electrode of the first driving transistor T01;

The gate electrode of the second transistor T2 is electrically connected to the third node a, the source electrode of the second transistor T2 is electrically connected to the second node b, and the drain electrode of the second transistor T2 is electrically connected to the gate electrode of the second driving transistor T02;

The first energy storage circuit 11 includes a first capacitor C1, and the second energy storage circuit 16 includes a second capacitor C2;

The first terminal of the first capacitor C1 is electrically connected to the first node c, and the second terminal of the first capacitor C1 is electrically connected to the second node b;

The first terminal of the second capacitor C2 is electrically connected to the third node a, and the second terminal of the second capacitor C2 is electrically connected to the source electrode of the first driving transistor T01;

Both the source electrode of the first driving transistor T01 and the source electrode of the second driving transistor T02 are electrically connected to the power supply voltage terminal ELVDD; the power supply voltage terminal ELVDD is used to provide a power supply voltage Vdd;

The drain electrode of the second driving transistor T02 is electrically connected to the second node b;

The third energy storage circuit 31 includes a third capacitor C3, and the second control data voltage writing-in circuit 32 includes a fourth transistor T4;

The first terminal of the third capacitor C3 is electrically connected to the source electrode of the first driving transistor T01, and the second terminal of the third capacitor C3 is electrically connected to the gate electrode of the second transistor T2;

The gate electrode of the fourth transistor T4 is electrically connected to the first writing-in control terminal G1, the source electrode of the fourth transistor T4 is electrically connected to the second control data voltage writing-in terminal D2, and the drain electrode of the fourth transistor T4 is electrically connected to the fourth node d;

The first control data voltage writing-in circuit 17 includes a third transistor T3;

The gate electrode of the third transistor T3 is electrically connected to the first writing-in control terminal G1, the source electrode of the third transistor T3 is electrically connected to the first control data voltage writing-in terminal D1, and the drain electrode of the third transistor T3 is electrically connected to the third node a;

The data writing-in circuit 41 includes a fifth transistor T5; the set circuit 42 includes a sixth transistor T6; the compensation control circuit 43 includes a seventh transistor T7;

The gate electrode of the fifth transistor T5 is electrically connected to the first writing-in control terminal G1, the source electrode of the fifth transistor T5 is electrically connected to the data line D0, and the drain electrode of the fifth transistor T5 is electrically connected to the first node c;

The gate electrode of the sixth transistor T6 is electrically connected to the light emitting control terminal E1, the source electrode of the sixth transistor T6 is electrically connected to the low voltage terminal VS, and the drain electrode of the sixth transistor T6 is electrically connected to the first node c; the low voltage terminal VS is used to provide a low voltage Vss;

The gate electrode of the seventh transistor T7 is electrically connected to the reset control terminal R1, the source electrode of the seventh transistor T7 is electrically connected to the second node b, and the drain electrode of the seventh transistor T7 is electrically connected to the drain electrode of the first driving transistor T01;

The light emitting control circuit 44 includes an eighth transistor T8;

The gate electrode of the eighth transistor T8 is electrically connected to the light emitting control terminal E1, the source electrode of the eighth transistor T8 is electrically connected to the drain electrode of the first driving transistor T01, and the drain electrode of the eighth transistor T8 is electrically connected to the anode of the organic light emitting diode O1;

The reset circuit 45 includes a ninth transistor T9;

The gate electrode of the ninth transistor T9 is electrically connected to the reset control terminal R1, the first electrode of the ninth transistor T9 is electrically connected to the low voltage terminal VS, and the drain electrode of the ninth transistor T9 is electrically connected to the anode of the organic light emitting diode O1.

In at least one embodiment of the pixel circuit shown in FIG. 10, the first writing-in control terminal G1, the second writing-in control terminal and the third writing-in control terminal are all the same writing-in control terminal; the set control terminal is the light emitting control terminal E1; the compensation control terminal is the reset control terminal R1; the set voltage terminal is the low voltage terminal VS; the reset voltage terminal is the low voltage terminal VS; but not limited thereto.

In at least one embodiment of the pixel circuit shown in FIG. 10, all transistors are p-type transistors, but not limited thereto.

In at least one embodiment of the pixel circuit shown in FIG. 10, the threshold voltage of the first driving transistor T01 is equal to the threshold voltage of the second driving transistor T02, the threshold voltage of T01 and the threshold voltage of T02 are both the threshold voltage Vth, but not limited thereto.

In at least one embodiment of the pixel circuit shown in FIG. 10, the aspect ratio of T02 may be twice that of T01, but not limited thereto.

Figure 11:
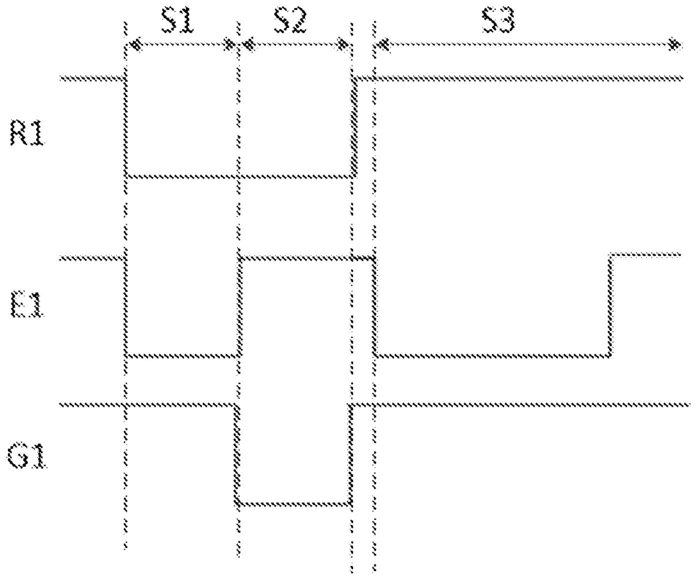
FIG. 11 is a working timing diagram of the pixel circuit shown in FIG. 10 of at least one embodiment of the present disclosure.
Figure 12A:
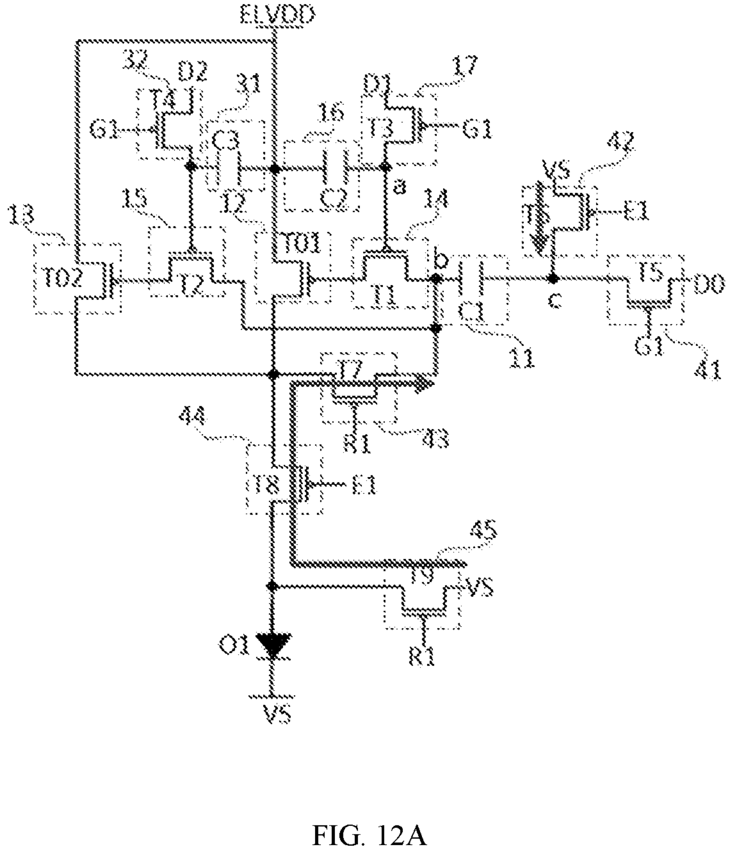
FIG. 12A is a schematic diagram of the working state of the pixel circuit shown in FIG. 10 in the first phase S1 of at least one embodiment of the present disclosure.
Figure 12B:
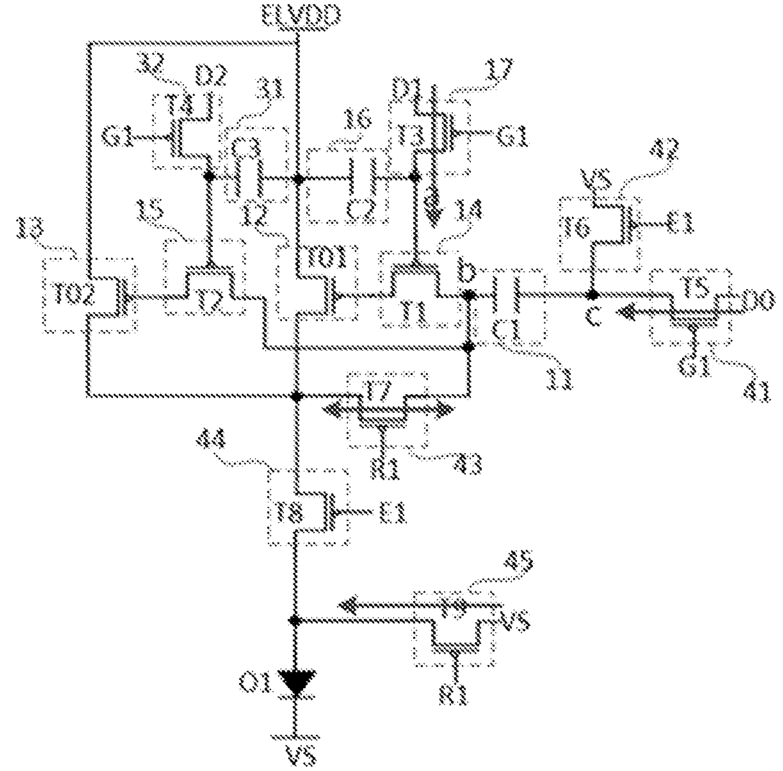
FIG. 12B is a schematic diagram of the working state of the pixel circuit shown in FIG. 10 in the second phase S2 of at least one embodiment of the present disclosure.
Figure 12C:
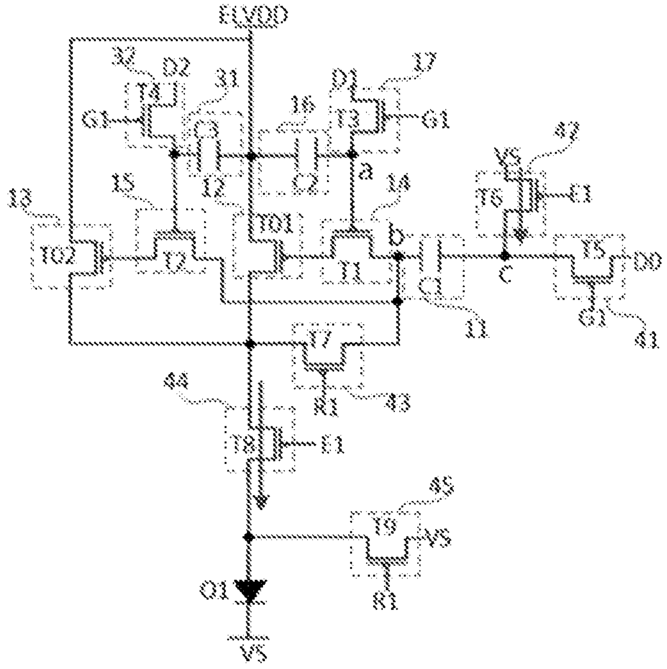
FIG. 12C is a schematic diagram of the working state of the pixel circuit shown in FIG. 10 in the third phase S3 of at least one embodiment of the present disclosure.

As shown in FIG. 11, when at least one embodiment of the pixel circuit shown in FIG. 10 of the present disclosure is in operation, the display period may include a first phase S1, a second phase S2 and a third phase S3 which are set successively;

In the first phase S1, R1 provides a low voltage signal, E1 provides a low voltage signal, G1 provides a high voltage signal, T7 is turned on, as shown in FIG. 12A, T6, T9 and T8 are all turned on, the potential of the second node b is Vss, the potential of the first node c is Vss;

In the second phase S2, R1 provides a low voltage signal, E1 provides a high voltage signal, G1 provides a low voltage signal, as shown in FIG. 12B, T9, T7, T5 and T3 are all turned on; D1 provides the first control data voltage Vdata1 to the third node a; D2 provides the second control data voltage Vdata2 to the fourth node d; D0 provides the data voltage Vdata0 to the first node c;

In the second phase S2, when Vdata1 is a low voltage signal and Vdata2 is a high voltage signal, T1 is turned on and T2 is turned off; at the beginning of the second phase S2, T01 is turned on, and the power supply voltage Vdd is charged to C1 through T01 and T7, to increase the potential of the gate electrode of T01 until T01 is turned off, at this time the potential of the gate electrode of T01 becomes Vdd+Vth;

In the second phase S2, when Vdata1 is a high voltage signal and Vdata2 is a low voltage signal, T1 is turned off and T2 is turned on; at the beginning of the second phase S2, T02 is turned on, and the power supply voltage Vdd is charged to C1 through T02 and T7, to increase the potential of the gate electrode of T02 until T02 is turned off, at this time the potential of the gate electrode of T02 becomes Vdd+Vth;

In the second phase S2, when Vdata1 is a low voltage signal and Vdata2 is a low voltage signal, T1 and T2 are turned on; at the beginning of the second phase S2, both T01 and T02 are turned on, and the power supply voltage Vdd charges C1 through T01, T02 and T7 to increase the potential of the gate electrode of T01 and the potential of the gate electrode of T02 until T01 and T02 are turned off, at this time, the potential of the gate electrode of T01 and the potential of the gate electrode of T02 are Vdd+Vth;

In the third phase S3, R1 provides a high voltage signal, E1 provides a low voltage signal, and G1 provides a high voltage signal, as shown in FIG. 12C, T6 and T8 are turned on;

When in the second phase S2, Vdata1 is a low voltage signal and Vdata2 is a high voltage signal, in the third phase S3, the potential of the second node b becomes Vdd+Vth1+Vss−Vdata0, and T01 drives O1 to emit light for low grayscale display, the current I flowing through O1 at this time is equal to K1×(Vdd+Vth+

$Vss-Vdata0-Vdd-Vth)^2$, I is equal to $K1\times(Vss-Vdata0)^2$; K1 is the current coefficient of T01;

When in the second phase S2, Vdata1 is a high voltage signal and Vdata2 is a low voltage signal, in the third phase S3, the potential of the second node b becomes Vdd+Vth1+Vss−Vdata0, and T02 drives O1 to emit light for middle grayscale display, the current I flowing through O1 at this time is equal to $K2\times(Vdd+Vth+Vss-Vdata0-Vdd-Vth)^2$, I is equal to $K2\times(Vss-Vdata0)^2$; K2 is the current coefficient of T02;

When in the second phase S2, Vdata1 is a low voltage signal and Vdata2 is a low voltage signal, in the third phase S3, the potential of the second node b becomes Vdd+Vth1+Vss−Vdata0, T01 and T01 jointly drive O1 to emit light for high grayscale display, the current I flowing through O1 is equal to $(K1+K2)\times(Vdd+Vth+Vss-Vdata0-Vdd-Vth)^2$, and I is equal to $(K1+K2)\times(Vss-Vdata0)^2$; K1 is the current coefficient of T01; K2 is the current coefficient of T02.

In at least one embodiment of the present invention, when the pixel circuit is applied to a wearable device, the aspect ratio W/L of the driving transistor in the red pixel circuit, the aspect ratio of the driving transistor in the green pixel circuit, and the aspect ratio of the driving transistors in the blue pixel circuit can be set to be different, but not limited thereto.

The driving method described in the embodiment of the present disclosure is applied to the above-mentioned pixel circuit, and the driving method includes:

Controlling, by the first driving control circuit, to connect or disconnect the second node and the control terminal of the first driving circuit under the control of the potential of the third node;

Controlling, by the second driving control circuit, to connect or disconnect the second node and the control terminal of the second driving circuit under the control of the potential of the fourth node;

Controlling, by the first control data voltage writing-in circuit, to write the first control data voltage provided by the first control data voltage writing-in terminal into the third node under the control of the first writing-in control signal;

Driving, by the first driving circuit, the light emitting element under the control of the potential of the control terminal of the first driving circuit; driving, by the second driving circuit, the light emitting element under the control of the potential of the control terminal of the second driving circuit.

Optionally, the third node and the fourth node are the same node; the pixel circuit also includes a data writing-in circuit, a set circuit, a compensation control circuit, a light emitting control circuit and a reset circuit; the display period includes a first phase, a second phase and a third phase set successively; the driving method includes:

In the first phase, the reset circuit writing the reset voltage provided by the reset voltage terminal into the first electrode of the light emitting element under the control of the reset control signal, and the light emitting control circuit controlling to connect the second terminal of first driving circuit and the first electrode of light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal;

In the second phase, the data writing-in circuit writing the data voltage provided by the data line into the first node under the control of the third writing-in control signal, and the reset circuit writing the reset voltage provided by the reset voltage terminal into the first electrode of the light emitting element under the control of the reset control signal, and the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal, and the first control data voltage writing-in circuit controlling to write the first control data voltage provided by the first control data voltage writing-in terminal into the third node under the control of the first writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the third node;

In the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit or the second driving circuit driving the light emitting element to emit light.

In at least one embodiment of the present disclosure, in the second phase, the step of the first driving control circuit controlling to connect or disconnect the second node and the control terminal of the first driving circuit under the control of the potential of the third node include:

When the first control data voltage is a second voltage signal, the first driving control circuit controlling to connect the second node and the control terminal of the first driving circuit under the control of the potential of the third node;

When the first control data voltage is a third voltage signal, the first driving control circuit controlling to disconnect the second node from the control terminal of the first driving circuit under the control of the potential of the third node;

In the second phase, the step of the second driving control circuit controlling to connect or disconnect the second node and the control terminal of the second driving circuit under the control of the potential of the third node includes:

When the first control data voltage is a second voltage signal, the second driving control circuit controlling to disconnect the second node from the control terminal of the second driving circuit under the control of the potential of the third node;

When the first control data voltage is a third voltage signal, the second driving control circuit controlling to connect the second node and the control terminal of the second driving circuit under the control of the potential of the third node;

The step of the first driving circuit or the second driving circuit driving the light emitting element to emit light includes:

When in the second phase, the first driving control circuit controls to connect the second node and the control terminal of the first driving circuit under the control of the potential of the third node, in the third phase, the first driving circuit driving the light emitting element to emit light;

When in the second phase, the second driving control circuit controls to connect the second node and the control terminal of the second driving circuit under the control of the potential of the third node, in the third phase, the second driving circuit driving the light emitting element to emit light.

Optionally, the pixel circuit also includes a third energy storage circuit and a second control data voltage writing-in circuit; the pixel circuit also includes a data writing-in circuit, a set circuit, a compensation control circuit, a light emitting control circuit and a reset circuit; the display period includes the first phase, the second phase and the third phase set successively; the driving method includes:

In the first phase, the reset circuit writing the reset voltage provided by the reset voltage terminal into the first electrode of the light emitting element under the control of the reset control signal, and the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal;

In the second phase, the data writing-in circuit writing the data voltage provided by the data line into the first node under the control of the third writing-in control signal, and the reset circuit writing the reset voltage provided by the reset voltage terminal into the first electrode of the light emitting element under the control of the reset control signal, and the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal; the first control data voltage writing-in circuit controlling to write the first control data voltage provided by the control data voltage writing-in terminal into the third node under the control of the first writing-in control signal; the second control data voltage writing-in circuit writing the second control data voltage provided by the second control data voltage writing-in terminal into the fourth node under the control of the second writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the fourth node;

In the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit and/or the second driving circuit driving the light emitting element to emit light.

In at least one embodiment of the present disclosure, in the second phase, the step of the first driving control circuit controlling to connect or disconnect the second node and the first driving circuit under the control of the potential of the third node include:

When the first control data voltage is a fourth voltage signal, the first driving control circuit controlling to connect the second node and the control terminal of the first driving circuit;

When the first control data voltage is a fifth voltage signal, the first driving control circuit controlling to disconnect the second node from the control terminal of the first driving circuit;

In the second phase, the step of the second driving control circuit controlling to connect or disconnect the second node and the control terminal of the second driving circuit under the control of the potential of the fourth node includes:

When the second control data voltage is a sixth voltage signal, the second driving control circuit controlling to connect the second node and the control terminal of the second driving circuit;

When the second control data voltage is a seventh voltage signal, the second driving control circuit controlling to disconnect the second node from the control terminal of the second driving circuit;

The step of the first driving circuit and/or the second driving circuit driving the light emitting element to emit light includes: when in the second phase, the first driving control circuit controls to connect the second node and the control terminal of the first driving circuit, and the second driving control circuit controls to disconnect the second node from the control terminal of the second driving circuit, the first driving circuit driving the light emitting element to emit light under the control of the potential of the control terminal of the first driving circuit;

When in the second phase, the first driving control circuit controls to disconnect the second node from the control terminal of the first driving circuit, and the second driving control circuit controls to connect the second node and the control terminal of the second driving circuit, the second driving circuit driving the light emitting element to emit light under the control of the potential of the control terminal of the second driving circuit;

When in the second phase, the first driving control circuit controls to connect the second node and the control terminal of the first driving circuit, and the second driving control circuit controls to connect the second node and the control terminal of the second driving circuit, the first driving circuit and the second driving circuit jointly driving the light emitting element to emit light under the control of the potential of the control terminal of the first driving circuit and the potential of the control terminal of the second driving circuit.

The display device described in at least one embodiment of the present disclosure includes the above-mentioned pixel circuit.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, those skilled in the art may make further modifications and improvements without departing from the spirit of the present disclosure, and these modifications and improvements shall also fall within the scope of the present disclosure.

What is claimed is:

1. A pixel circuit, comprising a light emitting element, a first energy storage circuit, a first driving circuit, a second driving circuit, a first driving control circuit, a second driving control circuit, a second energy storage circuit and a first control data voltage writing-in circuit; wherein a first terminal of the first energy storage circuit is electrically connected to a first node, a second terminal of the first energy storage circuit is electrically connected to a second node, and the first energy storage circuit is used for store electrical energy;

a control terminal of the first driving control circuit is electrically connected to a third node; a control terminal of the second driving control circuit is electrically connected to a fourth node;

the first driving control circuit is also electrically connected to the second node and the control terminal of the first driving circuit, is configured to control to connect or disconnect the second node and the control terminal of the first driving circuit under the control of a potential of the third node;

the second driving control circuit is also electrically connected to the second node and the control terminal of the second driving circuit, is configured to control to connect or disconnect the second node and the control terminal of the second driving circuit under the control of a potential of the fourth node;

a first terminal of the second energy storage circuit is electrically connected to the third node, and a second terminal of the second energy storage circuit is electrically connected to a first terminal of the first driving circuit, the second energy storage circuit is used to store electric energy;

the first control data voltage writing-in circuit is electrically connected to a first writing-in control terminal, a first control data voltage writing-in terminal and the third node respectively, is configured to control to write a first control data voltage provided by the first control data voltage writing-in terminal into the third node under the control of a first writing-in control signal provided by the first writing-in control terminal;

both the first terminal of the first driving circuit and the first terminal of the second driving circuit are electrically connected to a power supply voltage terminal, and the second terminal of the first driving circuit and the second terminal of the second driving circuit are all electrically connected to the light emitting element, the first driving circuit is used to drive the light emitting element under the control of a potential of the control terminal of the first driving circuit, and the second driving circuit is used to drive the light emitting element under the control of a potential of the control terminal of the second driving circuit.

2. The pixel circuit according to claim 1, wherein the third node and the fourth node are a same node.

3. The pixel circuit according to claim 2, wherein the first control data voltage writing-in circuit comprises a third transistor;

a control electrode of the third transistor is electrically connected to the first writing-in control terminal, a first electrode of the third transistor is electrically connected to the first control data voltage writing-in terminal, and a second electrode of the third transistor is electrically connected to the third node.

4. The pixel circuit according to claim 1, further comprising a third energy storage circuit and a second control data voltage writing-in circuit;

a first terminal of the third energy storage circuit is electrically connected to the first terminal of the first driving circuit, and a second terminal of the third energy storage circuit is electrically connected to the control terminal of the second driving control circuit, and the third energy storage circuit is used to store electric energy;

the second control data voltage writing-in circuit is electrically connected to a second writing-in control terminal, a second control data voltage writing-in terminal and the fourth node, and is configured to control to write a second control data voltage provided by the second control data voltage writing-in terminal into the fourth node under the control of a second writing-in control signal provided by the second writing-in control terminal.

5. The pixel circuit according to claim 4, wherein the third energy storage circuit comprises a third capacitor, and the second control data voltage writing-in circuit comprises a fourth transistor;

a first terminal of the third capacitor is electrically connected to the first terminal of the first driving circuit, and a second terminal of the third capacitor is electrically connected to the control terminal of the second driving control circuit;

a control electrode of the fourth transistor is electrically connected to the second writing-in control terminal, a first electrode of the fourth transistor is electrically connected to the second control data voltage writing-in terminal, and a second electrode of the fourth transistor is electrically connected to the fourth node.

6. The pixel circuit according to claim 1, further comprising a data writing-in circuit, a set circuit and a compensation control circuit; wherein the data writing-in circuit is respectively electrically connected to a data line, a third writing-in control terminal and the first node, and is configured to write a data voltage provided by the data line into the first node under the control of a third writing-in control signal provided by the third writing-in control terminal;

the set circuit is respectively electrically connected to a set control terminal, a set voltage terminal and the first node, and is configured to write a set voltage provided by the set voltage terminal into the first node under the control of a set control signal provided by the set control terminal;

the compensation control circuit is electrically connected to a compensation control terminal, the second node, and the second terminal of the first driving circuit, and is configured to control to connect or disconnect the second node and the second terminal of the first driving circuit under the control of a compensation control signal provided by the compensation control terminal.

7. The pixel circuit according to claim 6, wherein the data writing-in circuit comprises a fifth transistor; the set circuit comprises a sixth transistor; the compensation control circuit comprises a seventh transistor;

a control electrode of the fifth transistor is electrically connected to the third writing-in control terminal, a first electrode of the fifth transistor is electrically connected to the data line, and a second electrode of the fifth transistor is electrically connected to the first node;

a control electrode of the sixth transistor is electrically connected to the set control terminal, a first electrode of the sixth transistor is electrically connected to the set voltage terminal, and a second electrode of the sixth transistor is electrically connected to the first node;

a control electrode of the seventh transistor is electrically connected to the compensation control terminal, a first electrode of the seventh transistor is electrically connected to the second node, a second electrode of the seventh transistor is electrically connected to the second terminal of the first driving circuit.

8. The pixel circuit according to claim 1, further comprising a light emitting control circuit; wherein the light emitting control circuit is electrically connected to a light emitting control terminal, the second terminal of the first driving circuit and a first electrode of the light emitting element respectively, is configured to control to connect or disconnect the second terminal of the first driving circuit and the first electrode of the light emitting element under the control of a light emitting control signal provided by the light emitting control terminal;

a second electrode of the light emitting element is electrically connected to a first voltage terminal.

9. The pixel circuit according to claim 8, wherein the light emitting control circuit comprises an eighth transistor;

a control electrode of the eighth transistor is electrically connected to the light emitting control terminal, a first electrode of the eighth transistor is electrically connected to the second terminal of the first driving circuit, and a second electrode of the eighth transistor is electrically connected to the first electrode of the light emitting element.

10. The pixel circuit according to claim 1, further comprising a reset circuit; wherein the reset circuit is respectively electrically connected to a reset control terminal, a reset voltage terminal and the first electrode of the light emitting element, and is configured to write a reset voltage provided by the reset voltage terminal into the first electrode of the light emitting element under the control of a reset control signal provided by the reset control terminal;

the second electrode of the light emitting element is electrically connected to the first voltage terminal.

11. The pixel circuit according to claim 10, wherein the reset circuit comprises a ninth transistor;

a control electrode of the ninth transistor is electrically connected to the reset control terminal, a first electrode of the ninth transistor is electrically connected to the reset voltage terminal, and a second electrode of the ninth transistor is electrically connected to the first electrode of light emitting element.

12. The pixel circuit according to claim 1, wherein the first driving control circuit includes a first transistor, the second driving control circuit includes a second transistor, the first driving circuit includes a first driving transistor, and the second driving circuit includes a second driving transistor; a control electrode of the first transistor is electrically connected to the third node, a first electrode of the first transistor is electrically connected to the second node, a second electrode of the first transistor is electrically connected to the control terminal of the first driving circuit;

a control electrode of the second transistor is electrically connected to the fourth node, a first electrode of the second transistor is electrically connected to the second node, and a second electrode of the second transistor is electrically connected to the control terminal of the second driving circuit;

a control electrode of the first driving transistor is electrically connected to the control terminal of the first driving circuit, a first electrode of the first driving transistor is electrically connected to the first terminal of the first driving circuit, and a second electrode of the first driving transistor is electrically connected to the second terminal of the first driving circuit;

a control electrode of the second driving transistor is electrically connected to the control terminal of the second driving circuit, a first electrode of the second driving transistor is electrically connected to the first terminal of the second driving circuit, and a second electrode of the second driving transistor is electrically connected to the second terminal of the second driving circuit.

13. The pixel circuit according to claim 1, wherein the first energy storage circuit comprises a first capacitor, and the second energy storage circuit comprises a second capacitor;

a first terminal of the first capacitor is electrically connected to the first node, and a second terminal of the first capacitor is electrically connected to the second node;

a first terminal of the second capacitor is electrically connected to the third node, and a second terminal of the second capacitor is electrically connected to the first terminal of the first driving circuit.

14. A driving method applied to the pixel circuit according to claim 1, wherein the driving method comprises:

controlling, by the first driving control circuit, to connect or disconnect the second node and the control terminal of the first driving circuit under the control of the potential of the third node;

controlling, by the second driving control circuit, to connect or disconnect the second node and the control terminal of the second driving circuit under the control of the potential of the fourth node;

controlling, by the first control data voltage writing-in circuit, to write the first control data voltage provided by the first control data voltage writing-in terminal into the third node under the control of the first writing-in control signal;

driving, by the first driving circuit, the light emitting element under the control of the potential of the control terminal of the first driving circuit; driving, by the second driving circuit, the light emitting element under the control of the potential of the control terminal of the second driving circuit.

15. The driving method according to claim 14, wherein the third node and the fourth node are a same node; the pixel circuit also includes a data writing-in circuit, a set circuit, a compensation control circuit, a light emitting control circuit and a reset circuit; a display period includes a first phase, a second phase and a third phase set successively; the driving method includes:

in the first phase, the reset circuit writing the reset voltage provided by the reset voltage terminal into the first electrode of the light emitting element under the control of the reset control signal; the light emitting control circuit controlling to connect the second terminal of first driving circuit and the first electrode of light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal;

in the second phase, the data writing-in circuit writing the data voltage provided by the data line into the first node under the control of the third writing-in control signal; the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal; the first control data voltage writing-in circuit controlling to write the first control data voltage provided by the first control data voltage writing-in terminal into the third node under the control of the first writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the third node;

in the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit or the second driving circuit driving the light emitting element to emit light.

16. The driving method according to claim 15, wherein the step of in the second phase, the first driving control circuit controlling to connect or disconnect the second node and the control terminal of the first driving circuit under the control of the potential of the third node includes:

when the first control data voltage is a second voltage signal, the first driving control circuit controlling to connect the second node and the control terminal of the first driving circuit under the control of the potential of the third node;

when the first control data voltage is a third voltage signal, the first driving control circuit controlling to disconnect the second node from the control terminal of the first driving circuit under the control of the potential of the third node;

the step of in the second phase, the second driving control circuit controlling to connect or disconnect the second node and the control terminal of the second driving circuit under the control of the potential of the third node includes:

when the first control data voltage is the second voltage signal, the second driving control circuit controlling to disconnect the second node from the control terminal of the second driving circuit under the control of the potential of the third node;

when the first control data voltage is the third voltage signal, the second driving control circuit controlling to connect the second node and the control terminal of the second driving circuit under the control of the potential of the third node;

the step of the first driving circuit or the second driving circuit driving the light emitting element to emit light includes:

when in the second phase, the first driving control circuit controls to connect the second node and the control terminal of the first driving circuit under the control of the potential of the third node, in the third phase, the first driving circuit driving the light emitting element to emit light;

when in the second phase, the second driving control circuit controls to connect the second node and the control terminal of the second driving circuit under the control of the potential of the third node, in the third phase, the second driving circuit driving the light emitting element to emit light.

17. The driving method according to claim 14, wherein the pixel circuit also includes a third energy storage circuit and a second control data voltage writing-in circuit; the pixel circuit also includes a data writing-in circuit, a set circuit, a compensation control circuit, a light emitting control circuit and a reset circuit; a display period includes a first phase, a second phase and a third phase set successively; the driving method includes:

in the first phase, the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal, so as to write the reset voltage into the second node; the set circuit writing the set voltage provided by the set voltage terminal into the first node under the control of the set control signal;

in the second phase, the data writing-in circuit writing the data voltage provided by the data line into the first node under the control of the third writing-in control signal; the reset circuit writing the reset voltage provided by the reset voltage terminal into the first electrode of the light emitting element under the control of the reset control signal; the light emitting control circuit controlling to connect the second terminal of the first driving circuit and the first electrode of the light emitting element under the control of the light emitting control signal; the compensation control circuit controlling to connect the second node and the second terminal of the first driving circuit under the control of the compensation control signal; the first control data voltage writing-in circuit controlling to write the first control data voltage provided by the first control data voltage writing-in terminal into the third node under the control of the first writing-in control signal; the second control data voltage writing-in circuit writing the second control data voltage provided by the second control data voltage writing-in terminal into the fourth node under the control of the second writing-in control signal; the first driving control circuit controlling to connect or disconnect the second node and the control terminal of the first driving circuit under the control of the potential of the third node; the second driving control circuit controlling to connect or disconnect the second node and the control terminal of the second driving circuit under the control of the potential of the fourth node;

in the third phase, the set circuit writing the set voltage provided by the set voltage terminal into the first node under the control of the set control signal; the light emitting control circuit controlling to connect the second terminal of the first driving circuit and the first electrode of the light emitting element under the control of the light emitting control signal, and the first driving circuit and/or the second driving circuit driving the light emitting element to emit light.

18. The driving method according to claim 17, wherein the step of in the second phase, the first driving control circuit controlling to connect or disconnect the second node and the control terminal of the first driving circuit under the control of the potential of the third node includes:

when the first control data voltage is a fourth voltage signal, the first driving control circuit controlling to connect the second node and the control terminal of the first driving circuit;

when the first control data voltage is a fifth voltage signal, the first driving control circuit controlling to disconnect the second node from the control terminal of the first driving circuit;

the step of in the second phase, the second driving control circuit controlling to connect or disconnect the second node and the control terminal of the second driving circuit under the control of the potential of the fourth node includes:

when the second control data voltage is a sixth voltage signal, the second driving control circuit controlling to connect the second node and the control terminal of the second driving circuit;

when the second control data voltage is a seventh voltage signal, the second driving control circuit controlling to disconnect the second node from the control terminal of the second driving circuit;

the step of the first driving circuit and/or the second driving circuit driving the light emitting element to emit light includes: when in the second phase, the first driving control circuit controls to connect the second node and the control terminal of the first driving circuit, and the second driving control circuit controls to disconnect the second node from the control terminal of the second driving circuit, the first driving circuit driving the light emitting element to emit light under the control of the potential of the control terminal of the first driving circuit;

when in the second phase, the first driving control circuit controls to disconnect the second node from the control terminal of the first driving circuit, and the second driving control circuit controls to connect the second node and the control terminal of the second driving circuit, the second driving circuit driving the light emitting element to emit light under the control of the potential of the control terminal of the second driving circuit;

when in the second phase, the first driving control circuit controls to connect the second node and the control terminal of the first driving circuit, and the second driving control circuit controls to connect the second node and the control terminal of the second driving circuit, the first driving circuit and the second driving circuit jointly driving the light emitting element to emit light under the control of the potential of the control terminal of the first driving circuit and the potential of the control terminal of the second driving circuit.

19. A display device comprising the pixel circuit according to claim 1.

* * * * *